(12) United States Patent
Kajiwara et al.

(10) Patent No.: US 11,562,175 B2
(45) Date of Patent: *Jan. 24, 2023

(54) ABNORMALITY DETECTION APPARATUS AND VEHICLE SYSTEM

(71) Applicant: Renesas Electronics Corporation, Tokyo (JP)

(72) Inventors: Yuki Kajiwara, Tokyo (JP); Kosuke Miyagawa, Tokyo (JP); Masaki Nishibu, Tokyo (JP); Kentaro Sasahara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 16/883,003

(22) Filed: May 26, 2020

(65) Prior Publication Data
US 2020/0285905 A1 Sep. 10, 2020

Related U.S. Application Data

(63) Continuation of application No. 15/975,502, filed on May 9, 2018, now Pat. No. 10,679,102.

(30) Foreign Application Priority Data

Jun. 15, 2017 (JP) .............................. JP2017-117746

(51) Int. Cl.
*G06K 9/62* (2022.01)
*G06T 7/246* (2017.01)
*G06T 7/20* (2017.01)
*G06V 20/56* (2022.01)

(52) U.S. Cl.
CPC .............. *G06K 9/6261* (2013.01); *G06T 7/20* (2013.01); *G06T 7/246* (2017.01); *G06V 20/56* (2022.01); *G06T 2207/30244* (2013.01); *G06T 2207/30252* (2013.01)

(58) Field of Classification Search
CPC .... G06K 9/6261; G06K 9/00791; G06T 7/20; G06T 7/246; G06T 2207/30244
See application file for complete search history.

(56) References Cited

U.S. PATENT DOCUMENTS 10,679,102 B2 * 6/2020 Kajiwara ................. G06T 7/246
2002/0149476 A1 * 10/2002 Ogura ..................... G08G 1/166
348/148

(Continued)

FOREIGN PATENT DOCUMENTS

| JP | H 11-177964 A | 7/1999 |
| JP | 2016-015638 A | 1/2016 |

OTHER PUBLICATIONS

Chinese Office Action, dated Mar. 22, 2021, in Chinese Application No. 201810614960.5 and English Translation thereof.

(Continued)

*Primary Examiner* — Kevin Ky
(74) *Attorney, Agent, or Firm* — McGinn I.P. Law Group, PLLC.

(57) ABSTRACT

An abnormality detection apparatus including a feature extraction circuit configured to extract a feature point and a feature value of a first image, and a feature point and a feature value of a second image, a flow calculation circuit configured to calculate, based on the feature value of the first image, a first abnormality detection circuit configured to detect an abnormality in the first image based on a first optical flow, and to detect an abnormality in the second image based on a third optical flow, and a second abnormality detection circuit configured to detect an abnormality in the first or second image based on a result of a comparison between the second optical flow and a fourth optical flow.

19 Claims, 11 Drawing Sheets

(56) References Cited

U.S. PATENT DOCUMENTS

| | | | |
|---|---|---|---|
| 2003/0103663 A1* | 6/2003 | Li | G06T 7/0012 |
| | | | 382/131 |
| 2006/0269111 A1* | 11/2006 | Stoecker | G16H 30/40 |
| | | | 382/128 |
| 2008/0253665 A1* | 10/2008 | Mitarai | G06K 9/6252 |
| | | | 382/227 |
| 2012/0197461 A1* | 8/2012 | Barrows | G05D 1/0858 |
| | | | 701/1 |
| 2013/0170701 A1* | 7/2013 | Suzuki | G06T 7/00 |
| | | | 382/103 |
| 2013/0173208 A1* | 7/2013 | Kuzunishi | G01B 5/28 |
| | | | 73/104 |
| 2015/0326833 A1* | 11/2015 | Li | G06T 3/0087 |
| | | | 348/36 |
| 2016/0007018 A1 | 1/2016 | Ooi | |
| 2018/0053300 A1* | 2/2018 | Podilchuk | G06T 7/0016 |
| 2020/0285905 A1* | 9/2020 | Kajiwara | G06V 20/56 |

OTHER PUBLICATIONS

European Summons to attend Oral Proceedings issued Sep. 6, 2021 for European Patent Application No. 18 177 467.0-1207.
Jianbo Shi and Carlo Tomasi, "Good Features to Track", IEEE Conference on Computer Vision and Pattern Recognition, 1994, pp. 593-600.
Extended European Search Report dated Mar. 4, 2019 for European Patent Application No. 18177467.0-1207.
Communication Search Report dated May 14, 2019 for European Patent Application No. 18177467.0-1207.
S. Khan, et al., "Tracking in Uncalibrated Cameras with Overlapping Field of View", IEEE Transactions on Pattern Analysis and Machine Intelligence, XP055556736, Nov. 2001
Yaser Sheikh et al., "Object Tracking Across Multiple Independently Moving Airborne Cameras", 2013 IEEE International Conference on Computer Vision, vol. 2, XP055559035, Jan. 1, 2005.
Fei Yin, "Robust Wide-Area Multi-Camera Tracking of People and Vehicles to Improve cctv Usage" XP055560218, Retrieved from the Internet: URL: https://pdfs.semanticscholar.org/97f3/4a74dcd03clfc4bcd5361ab76dcs874631c4.pdf, Jan. 1, 2005.
European Office Action dated Mar. 2, 2020, in European Patent Application No. 18 177 467.0-1207.
European Office Action dated Nov. 6, 2018, in European Patent Application No. 18 177 467.0-1207.
United States Office Action dated Aug. 30, 2019, in U.S. Appl. No. 15/975,502.
United States Notice of Allowance dated Feb. 11, 2020, in U.S. Appl. No. 15/975,502.

* cited by examiner

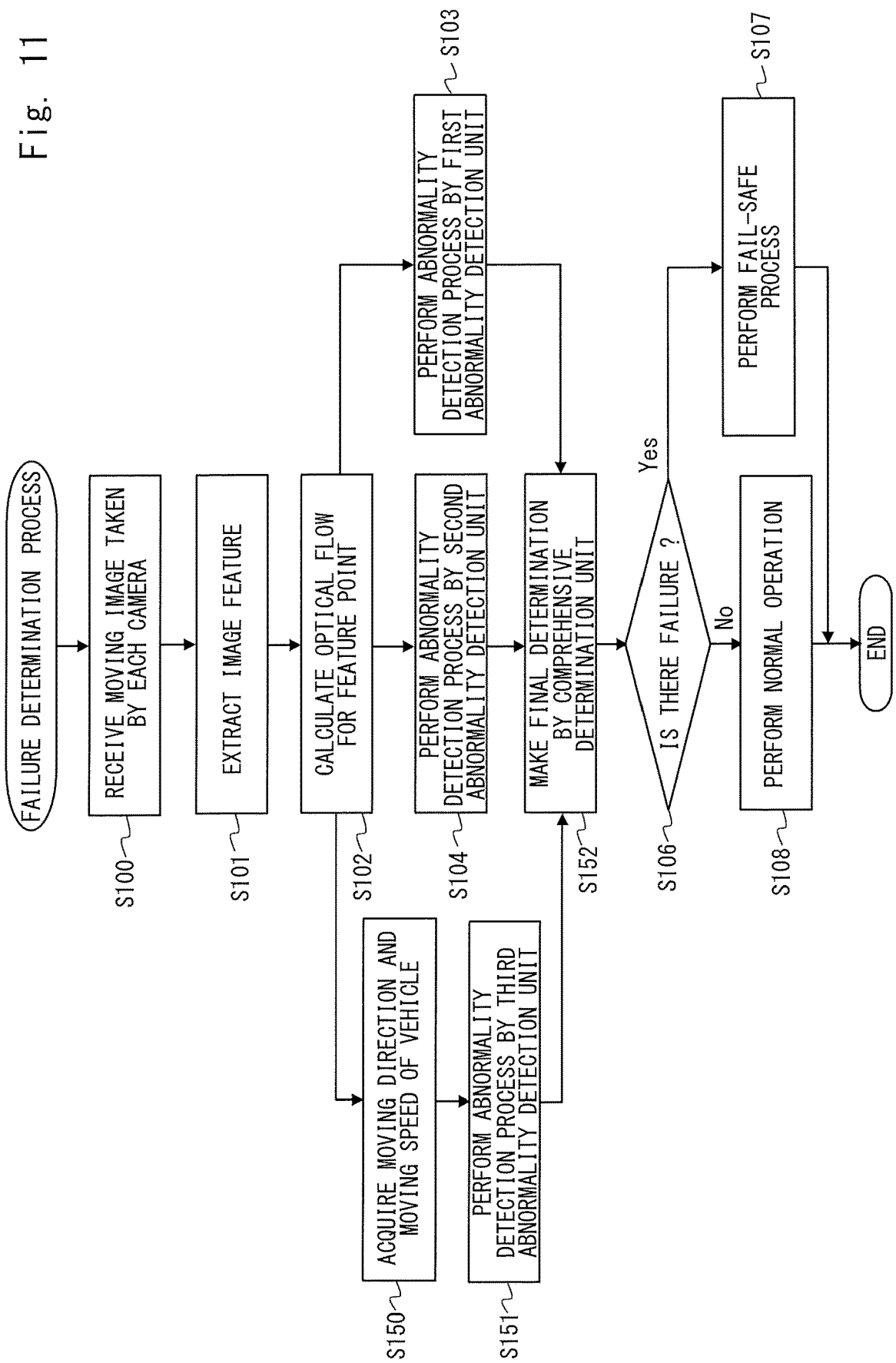

ABNORMALITY DETECTION APPARATUS AND VEHICLE SYSTEM

CROSS-REFERENCE TO RELATED APPLICATIONS

The present application is a Continuation Application of U.S. patent application Ser. No. 15/975,502, filed on May 9, 2018, which is based upon and claims the benefit of priority from Japanese patent application No. 2017-117746, filed on Jun. 15, 2017, the disclosure of which is incorporated herein in its entirety by reference.

BACKGROUND

The present disclosure relates to an abnormality detection apparatus and a vehicle system.

An apparatus that detects an abnormality in a camera has been known. For example, in techniques disclosed in Japanese Unexamined Patent Application Publication Nos. 2016-15638 and H11-177964, an abnormality in a camera is detected by designating or extracting an overlapped area in a plurality of images taken by respective cameras and comparing features in the overlapped area in the images. In such techniques, it is necessary that shooting ranges of at least two cameras overlap each other. Therefore, it is impossible to detect an abnormality in a camera whose shooting range does not overlap with any of the other cameras.

To detect an abnormality in such a camera, there is an abnormality detection method using continuity of an optical flow. In this method, a feature point in an image is extracted according to a predetermined algorithm (for example, an algorithm disclosed in Jianbo Shi and Carlo Tomasi, "Good Features to Track", IEEE Conference on Computer Vision and Pattern Recognition, 1994, pages 593-600) and this feature point is tracked through temporally consecutive images. Then, by determining whether or not the continuity of the movement of this feature point is maintained, it is possible to detect an abnormality in the camera whose shooting range does not overlap with any of the other cameras.

SUMMARY

The present inventors have found the following problem. When the shooting ranges of at least two cameras overlap each other, it is possible to detect an abnormality in these cameras based on features in the overlapped area in images and also possible to detect an abnormality in each camera by using the above-described optical flow. However, when an abnormality is detected by using both of these two methods, a processing time for the detection could increase.

Other problems and novel features will become apparent from descriptions in this specification and the accompanying drawings.

According to one embodiment, an abnormality detection apparatus includes a feature extraction unit configured to extract a feature point and a feature value according to a common extraction algorithm, a flow calculation unit, a first abnormality detection unit, and a second abnormality detection unit. Note that an extraction range for the feature point and the feature value extracted by the feature extraction unit is composed of a predetermined first partial area in a first image taken by a first camera, a predetermined second partial area in a second image taken by a second camera, and areas near places in the first and second images predicted as destinations of the feature point. Further, the first abnormality detection unit detects an abnormality in the first image based on an optical flow for the feature point in the first partial area and detects an abnormality in the second image based on an optical flow for the feature point in the second partial area. Further, the second abnormality detection unit detects an abnormality by using the feature point in a first overlapped extraction area defined in a first overlapped area and the feature point in the second overlapped extraction area defined in a second overlapped area.

According to the above-described embodiment, it is possible to, when the shooting ranges of at least two cameras overlap each other, carry out both of abnormality detection by using an image acquired from one camera performed by the first abnormality detection unit and abnormality detection by a comparison between at least two images acquired from respective cameras performed by the second abnormality detection unit while reducing the processing load.

BRIEF DESCRIPTION OF THE DRAWINGS

The above and other aspects, advantages and features will be more apparent from the following description of certain embodiments taken in conjunction with the accompanying drawings, in which:

FIG. 11 is a flowchart showing an example of an operation for an abnormality determination process performed by the vehicle system according to the third embodiment.

DETAILED DESCRIPTION

For clarifying the explanation, the following descriptions and the drawings are partially omitted and simplified as appropriate. The same symbols are assigned to the same elements throughout the drawings and duplicated explanations are omitted as appropriate.

Outline of Embodiment

Figure 1:
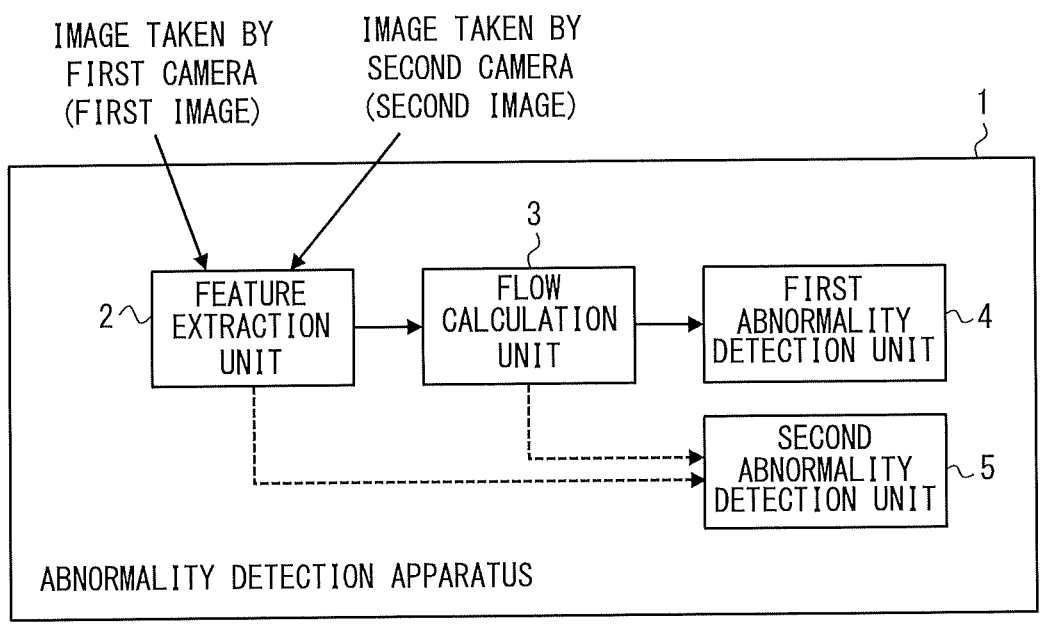
FIG. 1 is a block diagram showing an example of a configuration of an abnormality detection apparatus according to an outline of an embodiment.

Prior to describing details of an embodiment, firstly, an outline of the embodiment is given. FIG. 1 is a block diagram showing an example of a configuration of an abnormality detection apparatus 1 according to an outline of an embodiment. The abnormality detection apparatus 1 includes a feature extraction unit 2, a flow calculation unit 3, a first abnormality detection unit 4, and a second abnormality detection unit 5.

The feature extraction unit 2 receives a first image taken by a first camera and a second image taken by a second camera, and extracts image features (more specifically, feature points and feature values) therefrom. Note that the first and second cameras are cameras that take moving images. Further, the shooting ranges of the first and second cameras partially overlap each other. The feature extraction unit 2 extracts a feature point and a feature value in the first image and a feature point and a feature value in the second image according to a predetermined extraction algorithm. That is, this predetermined extraction algorithm is an algorithm that is commonly used when an abnormality is detected by the first abnormality detection unit 4 and when an abnormality is detected by the second abnormality detection unit 5. In other words, an algorithm for extracting a feature point and a feature value necessary for abnormality detection performed by the first abnormality detection unit 4 is the same as an algorithm for extracting a feature point and a feature value necessary for abnormality detection performed by the second abnormality detection unit 5.

Note that an extraction range for the feature point and the feature value extracted by the feature extraction unit 2 is composed of a first partial area which is a predetermined partial area in the first image, a second partial area which is a predetermined partial area in the second image, and areas near places in the first and second images predicted as destinations of the feature point.

The flow calculation unit 3 calculates an optical flow for the feature point extracted by the feature extraction unit 2 based on the feature value of that feature point. Note that the optical flow is a vector indicating a movement of a feature point in temporally consecutive time-series images. That is, the optical flow is a vector indicating a movement of a feature point through consecutive frames of moving images taken by a specific camera. For example, when a subject of a camera or a camera itself is moving in a straight line at a constant speed, feature points corresponding to the subject move in a fixed direction at a constant speed through temporally adjacent image frames.

The first abnormality detection unit 4 detects an abnormality in the first image based on the optical flow calculated for the first image by the flow calculation unit 3. Further, the first abnormality detection unit 4 detects an abnormality in the second image based on the optical flow calculated for the second image by the flow calculation unit 3. Specifically, the first abnormality detection unit 4 detects an abnormality in the first image based on the optical flow for the feature point in the above-described first partial area (i.e., the area in the first image where the feature point and the feature value are extracted) and detects an abnormality in the second image based on the optical flow for the feature point in the second partial area (i.e., the area in the second image where the feature point and the feature value are extracted). More specifically, the first abnormality detection unit 4 detects an abnormality in the first image based on the optical flow that is obtained by tracking the feature point located in the above-described first partial area in a predetermined area and detects an abnormality in the second image based on the optical flow that is obtained by tracking the feature point located in the second partial area in a predetermined area.

Note that an abnormality in an image may be caused by an abnormality (a failure) in a camera that has been used to take that image, or may be caused by an abnormality in one of processes that are performed from when image information is output from the camera to when this image information is input to the feature extraction unit 2 (i.e., a failure in an apparatus that perform this process). As described above, the abnormality detection performed by the first abnormality detection unit 4 is performed by using an image acquired from one camera to detect an abnormality in this camera or an abnormality in a specific process that has been performed for image information output from this camera.

The second abnormality detection unit 5 detects an abnormality in the first or second image based on a result of a comparison between a first index value for a feature point in a first overlapped area in the first image and a second index value for a feature point in a second overlapped area in the second image. Note that the first overlapped area is an overlapped area in the first image in which the shooting ranges in the first and second images overlap each other. The second overlapped area is an overlapped area in the second image in which the shooting ranges in the first and second images overlap each other. Therefore, the same subject is present in the first and second overlapped areas.

More specifically, the second abnormality detection unit 5 detects an abnormality by using a feature point in a first overlapped extraction area defined in the first overlapped area and a feature point in a second overlapped extraction area defined in the second overlapped area. Note that the first overlapped extraction area is an area in the first partial area that corresponds to the second partial area. Note that the first overlapped extraction area can also be regarded as being an area in the first partial area that overlaps the second partial area. Further, the second overlapped extraction area is an area in the second partial area that corresponds to the first partial area. Note that the second overlapped extraction area can also be regarded as being an area in the second partial area that overlaps the first partial area. That is, a subject that is present in an overlapped extraction area in an image is an object for which features are extracted in both the first and second images.

Note that similarly to the first abnormality detection unit 4, an abnormality in an image detected by the second abnormality detection unit 5 may be caused by an abnormality (a failure) in a camera that has been used to take that image, or may be caused by an abnormality in one of processes that are performed from when image information is output from the camera to when this image information is input to the feature extraction unit 2 (i.e., a failure in an apparatus that perform this process).

Further, as an example, the above-described index value is an optical flow for a feature point that starts from that feature point in the first overlapped area. However, the index value may be a feature value of the feature point in the first overlapped area. Note that in FIG. 1, broken-line arrows extending to the second abnormality detection unit 5 indicate such optionality of the index value. That is, when the above-described index value is an optical flow, the path that extends from the flow calculation unit 3 to the second abnormality detection unit 5 may exist, but the path that extends from the feature extraction unit 2 to the second abnormality detection unit 5 may not exist. Further, when the index value is a feature value, the path that extends from the flow calculation unit 3 to the second abnormality detection unit 5 may not exist, but the path that extends from the feature extraction unit 2 to the second abnormality detection unit 5 may exist.

It should be noted that in FIG. 1, the arrows connecting elements are merely examples of relations among the elements and are shown for easier understanding. That is, they are not shown to exclude relations among elements other than those shown in the abnormality detection apparatus 1 shown in FIG. 1.

As described above, in the abnormality detection apparatus 1, the first abnormality detection unit 4 performs abnormality detection using images acquired from one camera and the second abnormality detection unit 5 performs abnormality detection by comparing at least two images acquired from respective cameras. That is, since the abnormality detection apparatus 1 has two types of abnormality detection functions, i.e., abnormality detection by the first abnormality detection unit 4 and abnormality detection by the second abnormality detection unit 5, accuracy of the abnormality detection is improved compared to the case where only one type of abnormality detection is performed.

Further, in the abnormality detection apparatus 1, image features necessary for abnormality detection performed by the first abnormality detection unit 4 and those necessary for abnormality detection performed by the second abnormality detection unit 5 are not necessarily extracted by using different extraction algorithms. Therefore, an extraction result obtained by the feature extraction unit 2 can be used for both abnormality detection performed by the first abnormality detection unit 4 and abnormality detection performed by the second abnormality detection unit 5. That is, by using a common extraction algorithm, it is possible to carry out the image feature extraction process without performing complicated processes. Further, in the abnormality detection apparatus 1, a partial area is used as an extraction range for image features, instead of using the entire image area. Therefore, it is possible to reduce the load necessary for the image feature extraction process.

As described above, the abnormality detection apparatus 1 makes it possible to, when the shooting ranges of at least two cameras overlap each other, carry out both abnormality detection by the first abnormality detection unit 4 and abnormality detection by the second abnormality detection unit 5 while reducing the processing load.

First Embodiment

Figure 2:
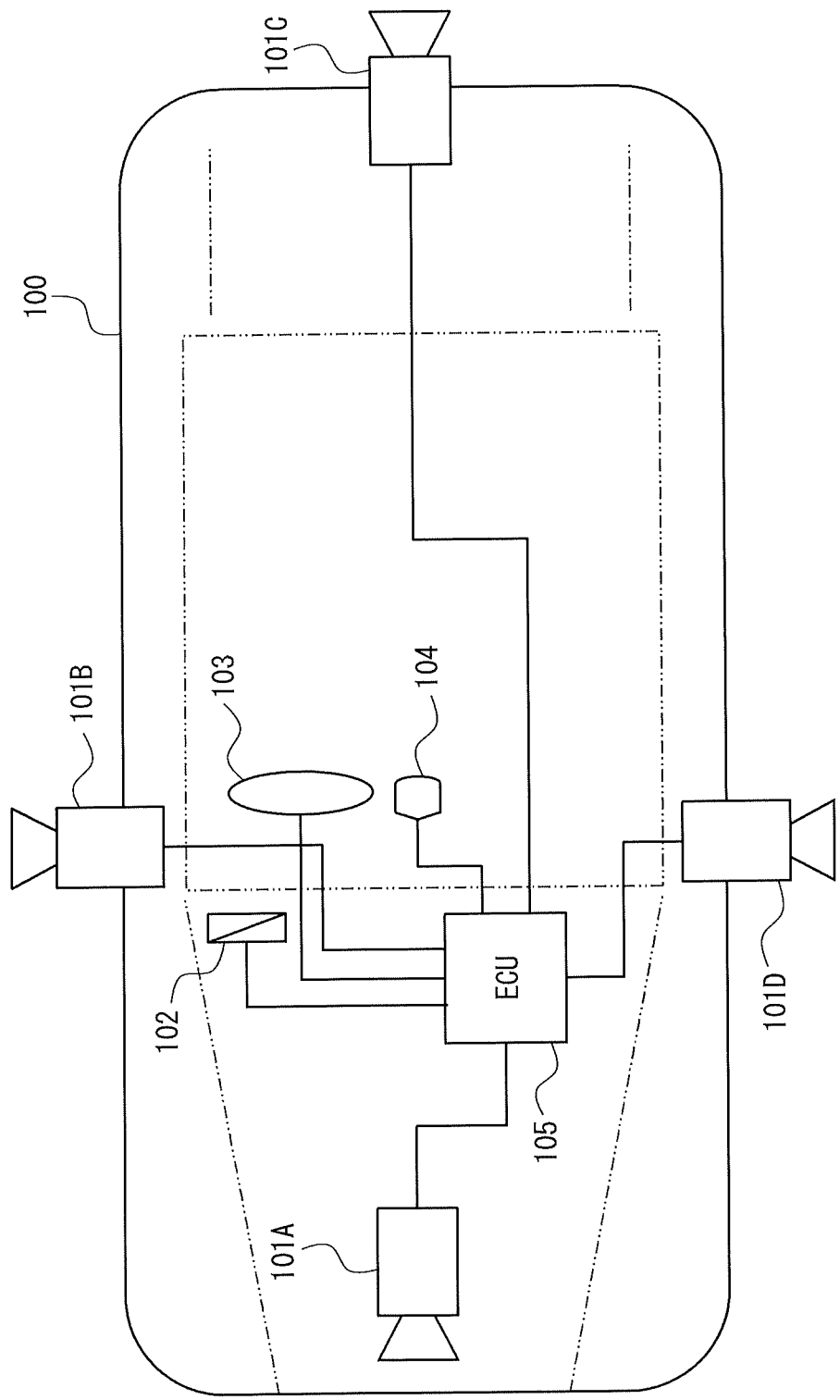
FIG. 2 is a schematic diagram showing an example of a positional relation among elements constituting a vehicle system according to a first embodiment.

Next, details of an embodiment are described. FIG. 2 is a schematic diagram showing an example of a positional relation among elements constituting a vehicle system 10 according to a first embodiment. The vehicle system 10 includes cameras 101A to 101D as information input devices installed in a vehicle 100 and other components installed in the vehicle 100. Note that in the example shown in FIG. 2, four cameras are shown. However, the vehicle system 10 needs to be equipped with only two cameras or more. In the example shown in FIG. 2, control devices such as a brake 102 and a steering wheel 103, and an information output device such as a warning display device 104 are shown as other components. Further, the vehicle system 10 includes an ECU (Electronic Control Unit) 105.

The cameras 101A to 101D, the brake 102, the steering wheel 103, and the warning display unit 104 are connected to the ECU 105 that recognizes information, determines a vehicle state, controls the vehicle, and performs communication. The ECU 105 may be a single component or may be composed of a plurality of components for respective functions. When the ECU 105 is composed of a plurality of components, these components are connected so that information can be mutually exchanged among them.

Note that the cameras 101A to 101D are cameras that take moving images of the surroundings of the vehicle 100 (i.e., a scene around the vehicle 100). The camera 101A is a camera installed on the front side of the vehicle 100 so that its main shooting range is in front of the vehicle 100. The camera 101B is a camera installed on the right side of the vehicle 100 so that its main shooting range is on the right side of the vehicle 100. The camera 101C is a camera installed on the rear side of the vehicle 100 so that its main shooting range is behind the vehicle 100. The camera 101D is a camera installed on the left side of the vehicle 100 so that its main shooting range is on the left side of the vehicle 100.

Note that the camera 101A is installed in the vehicle 100 so that its shooting range partially overlaps the shooting range of the camera 101B and partially overlaps the shooting range of the camera 101D. The camera 101B is installed in the vehicle 100 so that its shooting range partially overlaps the shooting range of the camera 101A and partially overlaps the shooting range of the camera 101C. The camera 101C is installed in the vehicle 100 so that its shooting range partially overlaps the shooting range of the camera 101B and partially overlaps the shooting range of the camera 101D. The camera 101D is installed in the vehicle 100 so that its shooting range partially overlaps the shooting range of the camera 101C and partially overlaps the shooting range of the camera 101A. It is assumed that the overlapped ranges of the cameras do not change with time.

Figure 3:
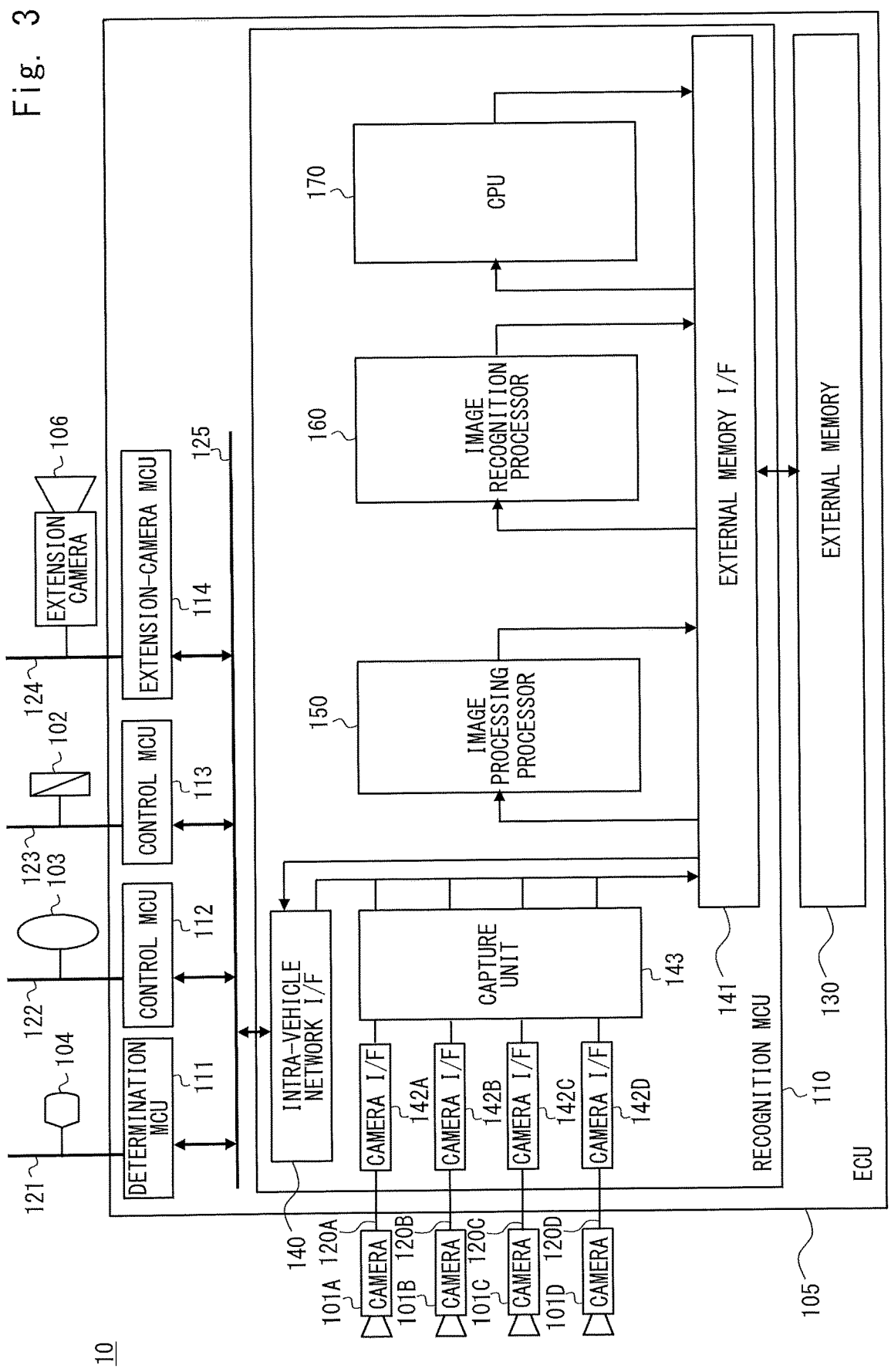
FIG. 3 is a block diagram showing an example of a hardware configuration of the vehicle system according to the first embodiment.

Next, the configuration of the vehicle system 10 is described in a more detailed manner with reference to FIG. 3. FIG. 3 is a block diagram showing an example of a hardware configuration of the vehicle system 10. As shown in FIG. 3, the ECU 105 includes a recognition MCU (Micro Controller Unit) 110, a determination MCU 111, and control MCUs 112 and 113. Note that when the vehicle system 10 supports connection of an extension camera 106 that is added to take moving images, the ECU 105 further includes an extension-camera MCU 114. Note that more than one extension camera 106 may be added. It should be noted that the added extension camera 106 may be installed in the vehicle 100 so that its shooting range overlaps the shooting range of at least one of other extension cameras 106 or at least one of the cameras 101A to 101D.

The recognition MCU 110 is an MCU for recognizing images taken by the cameras 101A to 101D and images taken by the extension camera 106. The recognition MCU 110 is connected to the cameras 101A to 101D through buses 120A to 120D, respectively.

The determination MCU 111 is an MCU for determining a state of the vehicle 100. The determination MCU 111 is connected to the warning display device 104 through a bus 121 and controls contents displayed in the warning display device 104.

The control MCU 112 is an MCU for controlling the vehicle 100 in accordance with an input from the steering wheel 103 and is connected to the steering wheel 103 through a bus 122. The control MCU 113 is an MCU for controlling the vehicle 100 in accordance with an input from the brake 102 and is connected to the brake 102 through a bus 123. The control MCUs 112 and 113 do not necessarily have to be separate MCUs. That is, they may be formed as one MCU.

The extension-camera MCU 114 is an MCU for processing signals input from the extension camera 106. The extension-camera MCU 114 performs, for example, processing similar to those performed by camera I/Fs 142A to 142D and a capture unit 143 (which are described later) and generates image data. Further, the extension-camera MCU 114 compresses image data in order to reduce an amount of data that is output to an intra-vehicle network 125. Note that the image data output from the extension-camera MCU 114 is stored in an external memory 130 through the intra-vehicle network 125 and the recognition MCU 110. When the extension-camera MCU 114 is provided, the extension camera 106 is connected to the extension-camera MCU 114 through a bus 124.

The recognition MCU 110, the determination MCU 111, the control MCUs 112 and 113, and the extension-camera MCU 114 are connected to the intra-vehicle network 125.

Further, the ECU 105 includes an external memory 130. The external memory 130 is a memory in which images taken by the cameras 101A to 101D and images taken by the extension camera 106 are stored.

Details of a configuration of the recognition MCU 110 are described hereinafter. The recognition MCU 110 includes an intra-vehicle network I/F 140, an external memory I/F 141, camera I/Fs 142A to 142D, a capture unit 143, an image processing processor 150, an image recognition processor 160, and a CPU (Central Processing Unit) 170.

The intra-vehicle network I/F 140 is an interface for inputting/outputting information from/to the intra-vehicle network 125. The external memory I/F 141 is an interface for inputting/outputting information from/to the external memory 130. The camera I/Fs 142A to 142D are interfaces for converting signals captured in the cameras 101A to 101D into signals in a signal format that can be accepted by the capture unit 143. For example, the camera I/Fs 142A to 142D are interfaces for converting input serial signals into parallel signals and outputting them to the capture unit 143.

Note that these interfaces may be connected to a dedicated network, or may be connected to a general-purpose network such as a CAN (Controller Area Network) or an Ethernet. Further, it is also possible to implement a connection to a general-purpose network by switching the same bus in a time-division manner or the like.

The capture unit 143 is a circuit that generates image data based on signals output from the cameras 101A to 101D. The image data output from the capture unit 143 is stored in the external memory 130 through the external memory I/F 141.

The image processing processor 150 is a circuit that performs predetermined image processing for images taken by the cameras 101A to 101D and the extension camera 106. The image processing processor 150 reads image data stored in the external memory 130 through the external memory I/F 141, performs predetermined image processing, and then stores the resultant image data, i.e., the data that has been subjected to the image processing in the external memory 130 through the external memory I/F 141. Note that examples of the predetermined image processing performed by the image processing processor 150 include a process for decoding compressed image data and a correction for a distortion in taken image data. However, the predetermined image processing is not limited these examples.

The image recognition processor 160 is a circuit that performs an image recognition process. The image recognition processor 160 performs an image recognition process for images that have been processed by the image processing processor 150. The image recognition processor 160 reads image data stored in the external memory 130 through the external memory I/F 141, performs a predetermined image recognition process, and then stores a result of the image recognition process in the external memory 130 through the external memory I/F 141. Specifically, as the image recognition process, the image recognition processor 160 extracts image features (more specifically, a feature point and a feature value) and calculates an optical flow therefor.

The CPU 170 carries out various processes by executing a program stored in the external memory 130 or other memories. The CPU 170 performs an abnormality detection process for detecting an abnormality in an image based on the image recognition result obtained by the image recognition processor 160.

In this embodiment, the image recognition processor 160 and the CPU 170 correspond to the abnormality detection apparatus 1 shown in FIG. 1. That is, the image recognition processor 160 and the CPU 170 perform an abnormality detection process based on image data which has been subjected to the image processing performed by the image processing processor 150. For example, when a failure occurs in one of the cameras 101A to 101D, the camera I/Fs 142A to 142D, the capture unit 143, and the image processing processor 150, an abnormality occurs in an image that is input to the image recognition processor 160. In this embodiment, a failure in the cameras 101A to 101D, the camera I/Fs 142A to 142D, the capture unit 143, and the image processing processor 150 is detected based on an abnormality in an image which occurs when the failure occurs in these circuits. Note that when the extension camera 106 is used, the extension camera 106 and the extension camera MCU 114 are also included in the target circuits in which a failure is detected.

Figure 4:
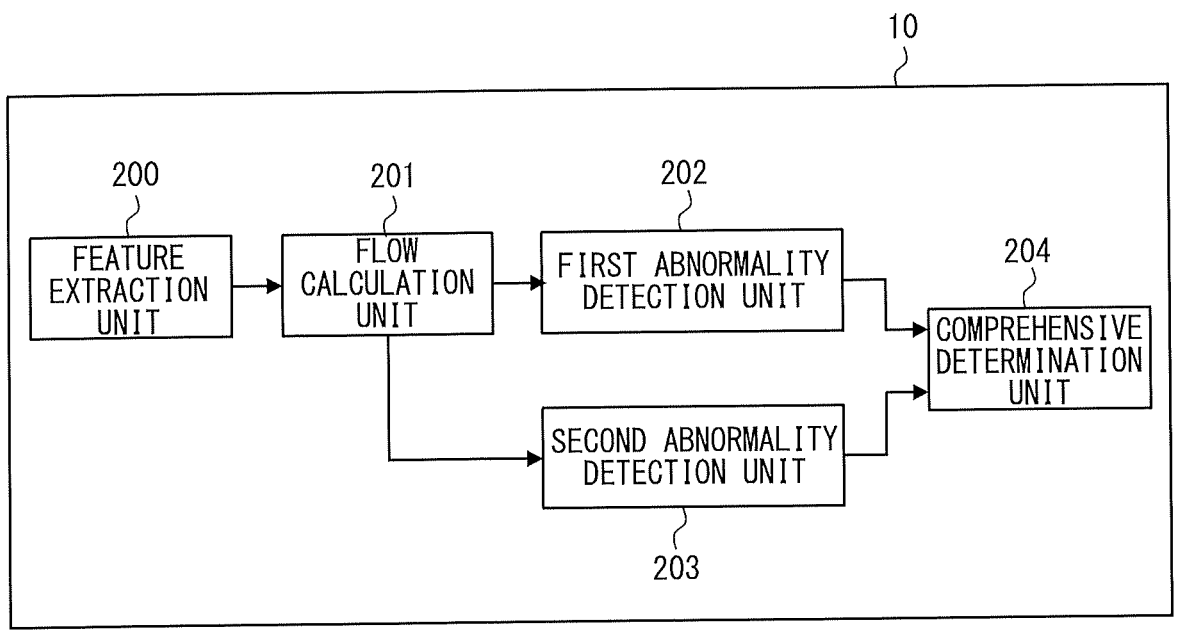
FIG. 4 is a block diagram showing an example of a functional configuration in the vehicle system according to the first embodiment.

Next, a functional configuration of the vehicle system 10 related to the abnormality detection process is described. FIG. 4 is a block diagram showing an example of a functional configuration related to the abnormality detection process performed in the vehicle system 10. As shown in FIG. 4, the vehicle system 10 includes a feature extraction unit 200, a flow calculation unit 201, a first abnormality detection unit 202, a second abnormality detection unit 203, and a comprehensive determination unit 204 as the configuration of the abnormality detection apparatus. Note that the feature extraction unit 200 and the flow calculation unit 201 are implemented by the image recognition processor 160. Further, the first abnormality detection unit 202, the second abnormality detection unit 203, and the comprehensive determination unit 204 are implemented by the CPU 170.

The feature extraction unit 200 corresponds to the feature extraction unit 2 shown in FIG. 1. That is, the feature extraction unit 200 extracts image features (i.e., a feature point and a feature value) of an image taken by each camera (i.e., each of the cameras 101A to 101D and the extension camera 106) according to a predetermined extraction algorithm. Note that since the cameras 101A to 101D and the extension camera 106 take moving images, the feature extracting unit 200 extracts image features for each of temporally consecutive image frames. In this embodiment, the feature extraction unit 200 extracts image features in images that have been subjected to image processing performed by the image processing processor 150.

Examples of the aforementioned predetermined extraction algorithm include known algorithms disclosed in scientific papers, such as Harris and GoodFeaturesToTrack. Regarding the feature points, for example, points by which an outline of a subject can be acquired in images and whose movements through frames can be traced are extracted. Such feature points exist, for example, in corners, but are not limited to corners. Further, the feature extraction unit 200 calculates feature values for extracted feature points according to the aforementioned predetermined extraction algorithm.

The feature extraction unit 200 performs an extraction process for an area in a feature extraction range that is defined in advance for each camera (see feature extraction ranges $R1_A$ and $R1_B$ in FIGS. 5 and 6) and for areas near places estimated as destinations of the feature point. Note that a relation between the feature extraction range and other ranges will be described later with reference to FIGS. 5 and 6. The positions in the image estimated as the destinations of the feature point are estimated by, for example, the flow calculation unit 201.

The flow calculation unit 201 corresponds to the flow calculation unit 3 shown in FIG. 1. The flow calculation unit 201 calculates an optical flow for the feature point extracted by the feature extraction unit 200 based on the feature value of the feature point. Specifically, when a feature point in an (n−1)-th image frame $I_{n-1}$ expressed as a feature point $A_{n-1}$, the flow calculation unit 201 calculates (i.e., determines) which direction a corresponding feature point $A_n$ extracted in an n-th image frame $I_n$, which is the frame next to the image frame $I_{n-1}$, has moved in by comparing the feature values of the feature points. In this way, the flow calculation unit 201 calculates a vector indicating the movement of the feature point through a plurality of frames. For example, the flow calculation unit 201 calculates the optical flow by using a known algorithm disclosed in scientific papers (such as OpticalFlowLK). Note that the flow calculation unit 201 calculates (i.e., determines) an optical flow starting from the feature point extracted by the feature extraction unit 200 in a flow tracking range defined in advance for each camera (see flow tracking ranges $R2_A$ and $R2_B$ in FIGS. 5 and 6). Note that a relation between the flow tracking range and other ranges will be described later.

Further, the flow calculation unit 201 estimates a place at a destination of the feature point. The flow calculation unit 201 estimates a place of a feature point $A_{n+1}$ in a (n+1)-th image frame $I_{n+1}$ from the optical flow that has been already calculated based on image frames up to the n-th image frame. For example, the flow calculation unit 201 estimates the place of the feature point $A_{n+1}$ in the (n+1)-th image frame $I_{n+1}$ under the assumption that the subject or the camera is moving substantially in a straight line at a constant speed. Then, the feature extraction unit 200 performs a process for extracting an image feature for an area near the place estimated by the flow calculation unit 201 (e.g., for an image area within a predetermined distance from the estimated place).

The first abnormality detection unit 202 corresponds to the first abnormality detection unit 4 shown in FIG. 1. That is, the first abnormality detection unit 202 detects an abnormality in an image acquired from the camera 101A based on an optical flow calculated for the image from the camera 101A by the flow calculation unit 201. Further, the first abnormality detection unit 202 detects an abnormality in an image acquired from the camera 101B based on an optical flow calculated for the image from the camera 101B by the flow calculation unit 201. Further, the first abnormality detection unit 202 detects an abnormality in an image acquired from the camera 101C based on an optical flow calculated for the image from the camera 101C by the flow calculation unit 201. Further, the first abnormality detection unit 202 detects an abnormality in an image acquired from the camera 101D based on an optical flow calculated for the image from the camera 101D by the flow calculation unit 201. Further, when the extension camera 106 is provided, the first abnormality detection unit 202 detects an abnormality in an image acquired from the extension camera 106 based on an optical flow for the image from the extension camera 106. In this way, the first abnormality detection unit 202 detects an abnormality in an image acquired from one camera by using the image from this camera.

Abnormality detection performed by the first abnormality detection unit 202 is further explained. Note that although abnormality detection for an image acquired from the camera 101A is explained hereinafter as an example, abnormality detection for images acquired from other cameras are performed in a similar manner. The first abnormality detection unit 202 detects an abnormality in an image acquired from the camera 101A based on ab optical flow starting from a feature point in a feature extraction range R1. The first abnormality detection unit 202 detects an abnormality in an image by determining continuity of an optical flow on the presumption that moving images are acquired by the camera when a subject or the camera is moving substantially in a straight line at a constant speed.

A determination of continuity of an optical flow made by the first abnormality detection unit 202 is described hereinafter. When temporal changes (i.e., changes over time) of the moving direction and the moving amount of the optical flow in the image acquired from the camera are within predetermined ranges, the first abnormality detection unit 202 determines that the image from the camera is normal. In contrast to this, when an optical flow in the image acquired from the camera of which temporal changes of the moving direction and the moving amount are within the predetermined ranges cannot be obtained, such as when temporal changes of the moving direction and the moving amount of the optical flow are not within the predetermined ranges, the first abnormality detection unit 202 determines that the image from the camera is abnormal.

When the subject of the camera 101A or the camera 101A itself is moving substantially in a straight line at a constant speed, the moving direction and the moving amount of a feature point through temporally adjacent frames that are acquired from the camera 101A at a predetermined frame rate become constant. Therefore, the first abnormality detection unit 202 determines whether or not a difference between a moving direction $P_n$ and a moving direction $P_{n+1}$ is within a permissible range $P_R$ and determines whether or not a moving distance $Q_n$ and a moving distance $Q_{n+1}$ is within a permissible range $Q_R$. Note that the moving direction $P_n$ is a moving direction from a feature point $A_{n-1}$ in an (n−1)-th image frame $I_{n-1}$ to its corresponding feature point $A_n$ in an n-th image frame $I_n$. The moving direction $P_{n+1}$ is a moving direction from the feature point $A_n$ to its corresponding feature point $A_{n+1}$ in an image frame $I_{n+1}$. Further, the moving distance $Q_n$ is a moving distance from the feature point $A_{n-1}$ to the feature point $A_n$, and the movement distance $Q_{n+1}$ is a moving distance from the feature point $A_n$ to the feature point $A_{n+1}$.

The first abnormality detection unit 202 determines that the image is normal when the difference between the moving directions $P_n$ and $P_{n+1}$ is within the permissible range $P_R$ and the difference between the moving distances $Q_n$ and $Q_{n+1}$ is within the permissible range $Q_R$. Further, the first abnormality detection unit 202 determines that the image is abnormal in all the other cases. For example, when some failure occurs in any of the circuits located between the camera 101A and the image recognition processor 160 or in the camera 101A itself and hence images are not supplied from the camera 101A at regular intervals, the optical flow of which the temporal changes of the moving direction and the moving amount are within the predetermined ranges cannot be obtained. Therefore, the first abnormality detection unit 202 detects an abnormality in the image. Note that in the abnormality detection by the first abnormality detection unit 202, the subject or the camera does not necessarily have to be moving absolutely in a straight line at a constant speed. That is, the only requirement for the abnormality detection by the first abnormality detection unit 202 is that the subject or the camera should be moving. In other words, the moving direction and the moving speed of the subject or the camera may be changed. This is because the time between adjacent image frames is sufficiently small and the permissible range is defined for the determination as described above.

The second abnormality detection unit 203 corresponds to the second abnormality detection unit 5 shown in FIG. 1. That is, the second abnormality detection unit 203 detects an abnormality in an image using an optical flow for a feature point in an overlapped area of a plurality of images taken by respective cameras. The second abnormality detection unit 203 requires at least two cameras whose shooting ranges partially overlap each other in order to detect an abnormality in an image. Details of the second abnormality detection unit 203 are explained hereinafter by using a camera 101A and a camera 101B whose shooting ranges partially overlap each other. However, the second abnormality detection unit 203 performs a similar process for other combinations of cameras whose shooting ranges overlap each other.

Figure 5:
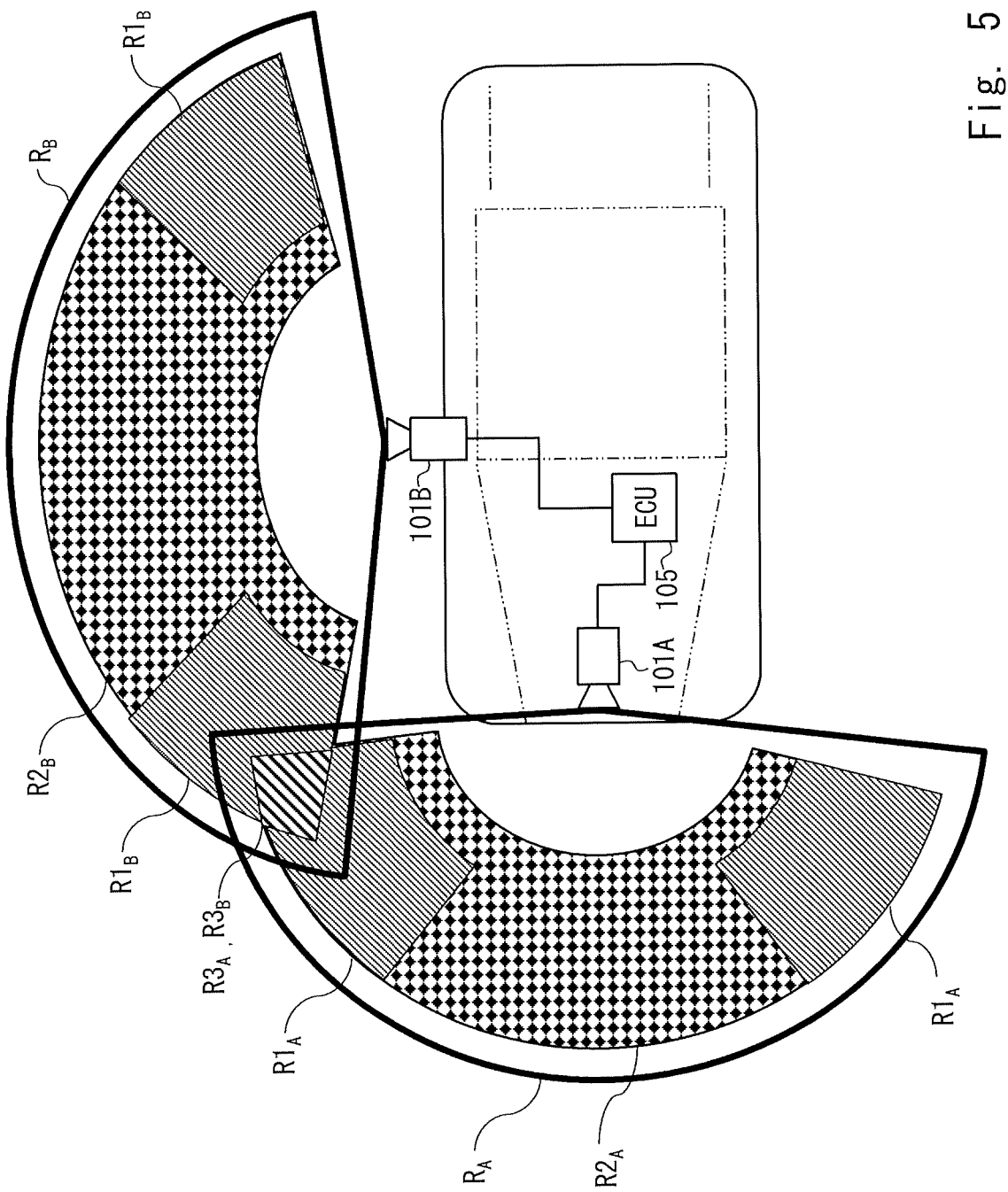
FIG. 5 is a schematic diagram showing a relation among shooting ranges, feature extraction ranges, flow tracking ranges, and overlapped extraction areas.
Figure 6:
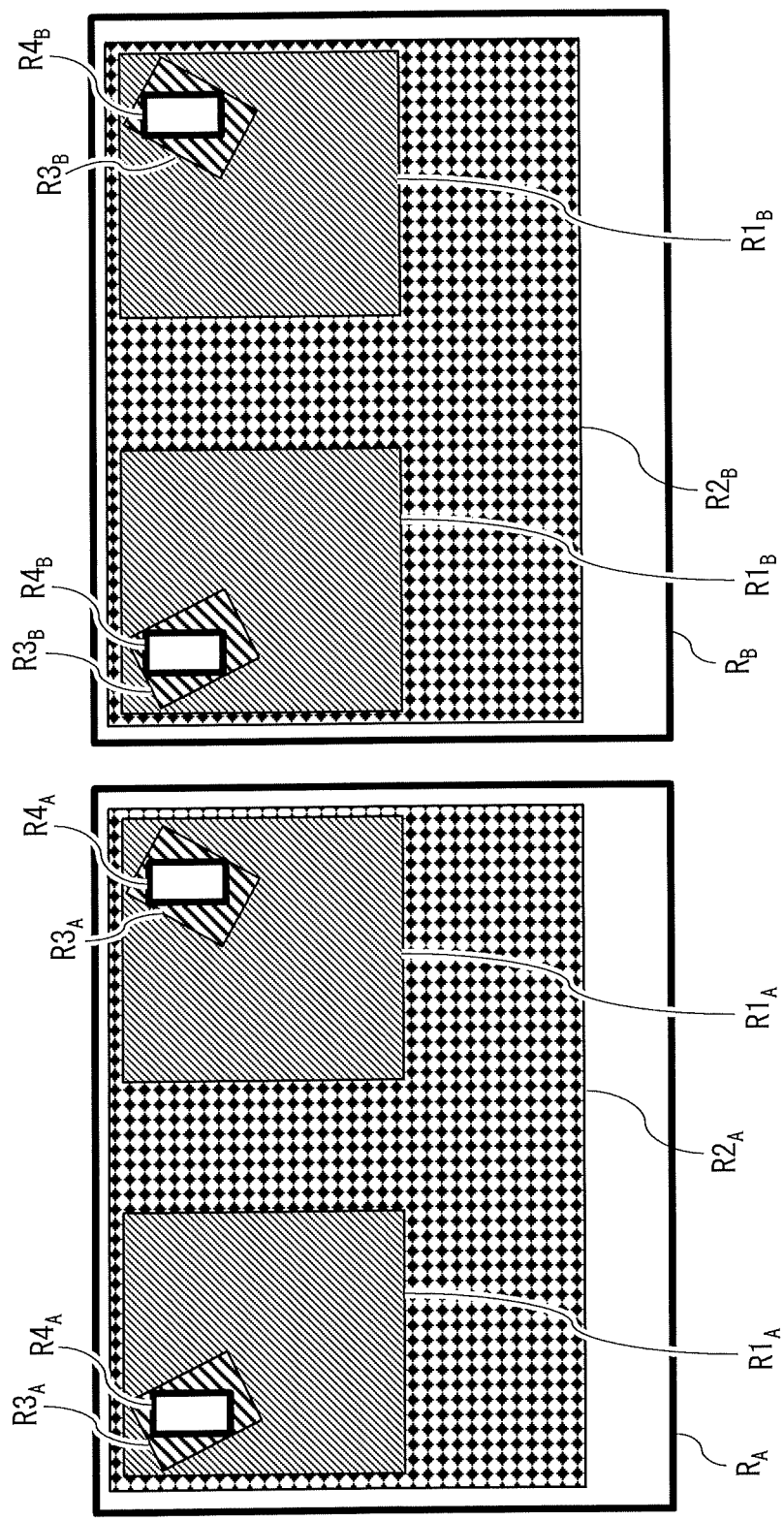
FIG. 6 is a schematic diagram showing a relation among ranges in images taken by cameras.

The second abnormality detection unit 203 detects an abnormality in an image acquired from the camera 101A or 101B based on a result of a comparison between an optical flow for a feature point in an overlapped extraction area in an image from the camera 101A (see an overlapped extraction area $R3_A$ in FIGS. 5 and 6) and an optical flow for a feature point in an overlapped extraction area in an image from the camera 101B (see an overlapped extraction area $R3_B$ in FIGS. 5 and 6). Note that the overlapped extraction area in the image acquired from the camera 101A corresponds to the above-described first overlapped extraction area, and is an area in the feature extraction range in the image from the camera 101A (see the feature extraction range $R1_A$ in FIGS. 5 and 6) that corresponds to the feature extraction range in the image acquired from the camera 101B (see the feature extraction range $R1_B$ in FIGS. 5 and 6). In other words, the overlapped extraction area in the image acquired from the camera 101B corresponds to the above-described second overlapped extraction area, and is an area in the feature extraction range in the image from the camera 101B (see the feature extraction range $R1_B$ in FIGS. 5 and 6) that corresponds to the feature extraction range in the image acquired from the camera 101A (see the feature extraction range $R1_A$ in FIGS. 5 and 6).

A relation among the shooting range, the feature extraction range, the flow tracking range, and the overlapped extraction area is explained hereinafter with reference to FIGS. 5 and 6. FIG. 5 is a schematic diagram showing a relation among shooting ranges, feature extraction ranges, flow tracking ranges, and overlapped extraction areas. Note that FIG. 5 shows the relation when viewed from above the vehicle 100. FIG. 6 is a schematic diagram showing a relation among ranges in an image taken by the camera 101A (a left part in FIG. 6) and a relation among ranges in an image taken by the camera 101B (a right part in FIG. 6). Note that the images shown in FIG. 6 are rectangular images that are obtained by performing predetermined image processing such as a decoding process and a correction for a distortion for images acquired from the camera by using the image processing processor 150. The feature extraction unit 200 and the flow calculation unit 201 process such rectangular images. Although FIGS. 5 and 6 show ranges related only to the cameras 101A and 101B, similarly ranges are also defined for the other cameras. A relation among the ranges is explained hereinafter with reference to FIGS. 5 and 6.

In FIG. 5, a shooting range $R_A$ of the camera 101A and a shooting range RB of the camera 101B are indicated by ranges enclosed with thick solid lines. In FIG. 6, each of the shooting ranges RA and $R_B$ is an area indicated by the outermost rectangular frame. In FIG. 5, the shooting ranges $R_A$ and $R_B$ partially overlap each other. The feature extraction range $R1_A$ is defined in advance as a part of the area of the shooting range $R_A$. Similarly, the feature extraction range $R1_B$ is defined in advance as a part of the area of the shooting range $R_B$. In particular, the feature extraction range $R1_A$ partially extends into and overlap the shooting range $R_B$ of the other camera 101B. Similarly, the feature extraction range $R1_B$ partially extends into and overlap the shooting range $R_A$ of the other camera 101A. In other words, at least a part of the feature extraction range is defined in at least a part of the area that overlaps the shooting range of the other camera. Note that in FIGS. 5 and 6, the feature extraction ranges ($R1_A$ and $R1_B$) are indicated by fine hatching. The feature extraction range $R1_A$ is also referred to as a first partial area and the feature extraction range $R1_B$ is also referred to as a second partial area.

For the camera 101A, feature extraction ranges $R1_A$ are defined on both sides of the shooting range $R_A$. One of the feature extraction range $R1_A$ is a feature extraction range that is defined so as to include a part of the area overlapping the shooting range $R_B$ of the camera 101B, and the other feature extraction range $R1_A$ is a feature extraction range that is defined so as to include a part of the area overlapping the shooting range of the camera 101D (not shown). Similarly, for the camera 101B, feature extraction ranges $R1_B$ are defined on both sides of the shooting range $R_B$. One of the feature extraction range $R1_B$ is a feature extraction range that is defined so as to include a part of the area overlapping the shooting range $R_A$ of the camera 101A, and the other feature extraction range $R1_B$ is a feature extraction range that is defined so as to include a part of the area overlapping the shooting range of the camera 101C (not shown). Note that in the example shown in FIG. 5, the feature extraction range is defined in the part of the area where the shooting ranges of both cameras overlap each other. However, the feature extraction range may be defined over the entire area where the shooting ranges of both cameras overlap each other.

In FIGS. 5 and 6, flow tracking ranges are indicated by areas filled with dots ($R2_A$ and $R2_B$). The flow tracking range is defined so as to include the feature extraction ranges therein. In other words, the flow tracking range is defined in a wider area than the feature extraction range. Specifically, the flow tracking range $R2_A$ for the camera 101A is defined so as to include both of the feature extraction ranges $R1_A$ located on both sides. Similarly, the flow tracking range $R2_B$ for the camera 101B is defined so as to include both of the feature extraction ranges $R1_B$ located on both sides. Therefore, the feature extraction range $R1_A$ is also (a part of) the flow tracking range $R2_A$. Further, the feature extraction range RIB is also (a part of) the flow tracking range $R2_B$. Note that in FIGS. 5 and 6, the flow tracking range is defined in a part of the area of the shooting range of the camera. However, the flow tracking range may be defined over the entire shooting range of the camera.

In FIGS. 5 and 6, the overlapped extraction areas ($R3_A$ and $R3_B$) are areas indicated by coarse hatching. The overlapped extraction area is a part where the feature extraction range in an image taken by one of the cameras and the feature extraction range in an image taken by the other camera overlap each other in the shooting range. The overlapped extraction area $R3_A$ for the camera 101A is also (a part of) the feature extraction range $R1_A$ and (a part of) the flow tracking range $R2_A$. Similarly, the overlapped extraction area $R3_B$ for the camera 101B is also (a part of) the feature extraction range $R1_B$ and (a part of) the flow tracking range $R2_B$.

The second abnormality detection unit 203 detects an abnormality in an image by using an optical flow that is obtained by using a predetermined area in an overlapped area in an image taken by the camera 101A that overlaps an image taken by the camera 101B as a tracking range for that optical flow and an optical flow that is obtained by using a predetermined area in an overlapped area in the image taken by the camera 101B that overlaps the image taken by the camera 101A as a tracking range for that optical flow. That is, for the abnormality detection process performed by the second abnormality detection unit 203, a feature point in the image of the camera 101A is tracked within the predetermined area in the overlapped area of the image of the camera 101A. Similarly, for the abnormality detection process performed by the second abnormality detection unit 203, a feature point in the image of the camera 101B is tracked within the predetermined area in the overlapped area of the image of the camera 101B. In the following description, this predetermined area in the overlapped area is also referred to as a comparison area. Note that the shooting range of the comparison area in the one of the images corresponds to the shooting range of the comparison area in the other image. That is, a subject that is present in the comparison area of one of the images is also present in the comparison area of the other image. In this embodiment, the comparison area is rectangular areas $R4_A$ and $R4_B$ defined in the overlapped extraction areas $R3_A$ and $R3_B$ (see FIG. 6. However, the comparison area may be the overlapped extraction areas $R3_A$ and $R3_B$. Note that details of the rectangular areas $R4_A$ and $R4_B$ will be described later.

In contrast to this, the first abnormality detection unit 202 detects an abnormality in images taken by the camera 101A and 101B by using an optical flow that is obtained by using a range wider than the tracking range used in the second abnormality detection unit 203 as its tracking range. Specifically, for the abnormality detection process performed by the first abnormality detection unit 202, a feature point in the image of the camera 101A is tracked in the flow tracking range $R2_A$. Similarly, for the abnormality detection process performed by the first abnormality detection unit 202, a feature point in the image of the camera 101B is tracked in the flow tracking range $R2_B$.

Details of the abnormality detection performed by the second abnormality detection unit 203 are further explained. The second abnormality detection unit 203 detects an abnormality by comparing a first frequency distribution, which indicates the number of samples (a frequency) for each direction for an optical flow for a feature point in a comparison area in an image acquired from the camera 101A, and a second frequency distribution, which indicates the number of samples (a frequency) for each direction for an optical flow for a feature point in a comparison area in an image acquired from the camera 101B. Note that in this embodiment, the comparison area is the rectangular areas $R4_A$ and $R4_B$ as described above. However, the comparison area may be the overlapped extraction areas $R3_A$ and $R3_B$.

For example, as the aforementioned first frequency distribution, the second abnormality detection unit 203 creates a histogram of moving directions for an optical flow of a feature point in the comparison area. Further, as the aforementioned second frequency distribution, the second abnormality detection unit 203 creates a histogram of moving directions for an optical flow of a feature point in the comparison area. Then, the second abnormality detection unit 203 calculates a normalized cross-correlation between elements of both histograms and determines whether or not both histograms are similar to each other. When the second abnormality detection unit 203 determines that both histograms are similar to each other, i.e., the first and second frequency distributions are similar to each other, it determines that both of the images acquired from the cameras 101A and 101B are normal. When the second abnormality detection unit 203 determines that both histograms are not similar to each other, i.e., the first and second frequency distributions are not similar to each other, it determines that one of the images acquired from the cameras 101A and 101B is abnormal. Note that since the second abnormality detection unit 203 detects an abnormality by performing a comparison, it cannot determine which of the images of the cameras 101A and 101B is abnormal.

Note that as described above, in this embodiment, the second abnormality detection unit 203 creates a frequency distribution by using an optical flow for a feature point in a pre-designated rectangular area in the overlapped extraction area. That is, in FIG. 6, the determination process is performed by using a feature point in the rectangular area $R4_A$, which is a predetermined comparison area, indicated by a thick solid-line frame in the overlapped extraction area $R3_A$ and a feature point in the rectangular area $R4_B$, which is a predetermined comparison area, indicated by a thick solid-line frame in the overlapped extraction area $R3_B$. As described above, in this embodiment, in the process performed by the second abnormality detection unit 203, the feature point in the predetermined rectangular area included in the overlaid extraction area is used. However, a feature point in the whole overlapped extraction area or a feature point in an area having a predetermined arbitrary shape in the overlapped extraction area may be used. Note that the area having the predetermined shape in the overlapped extraction area is defined in advance in, for example, the designing phase of the vehicle system 10 so that it does not extend to the outside of the overlapped extraction area.

It should be noted that when the shooting direction of the camera 101A differs from that of the camera 101B as in the case of this embodiment, the moving direction of a subject in an image of the camera 101A differs from the moving direction of that subject in an image of the camera 101B. That is, when a given subject has spatially moved in a direction X, while a feature point of the subject in an image acquired from the camera 101A moves in, for example, a direction $X_A$, a feature point of that subject in an image acquired from the camera 101B moves in, for example, a direction $X_B$. Therefore, when the shooting directions of the cameras 101A and 101B differ from each other, the second abnormality detection unit 203 creates a histogram for an optical flow in which the moving direction is normalized. Therefore, a rotation process is performed for the optical flow so that the direction $X_A$ is normalized to the direction X, and a rotation process is performed for the optical flow so that the direction $X_B$ is normalized to the direction X. A rotation angle in the rotation process is different for each camera and according to the shooting direction of each camera. For example, the rotation angle is defined in advance in the designing phase of the vehicle system 10. Therefore, when the shooting directions of the cameras 101A and 101B differ from each other, the second abnormality detection unit 203, for example, rotates the moving direction calculated by the flow calculation unit 201 for the feature point in the image of the camera 101A by a predefined first angle and then creates a frequency distribution. Similarly, the second abnormality detection unit 203 rotates the moving direction calculated by the flow calculation unit 201 for the feature point in the image of the camera 101B by a predefined second angle and then creates a frequency distribution. However, when the shooting directions of the cameras 101A and 101B are the same as each other, the above-described rotation process is unnecessary.

Next, the comprehensive determination unit 204 is described. The comprehensive determination unit 204 makes a final determination on the presence/absence of an abnormality in an image based on detection results of the first and second abnormality detection units 202 and 203. Therefore, the determinations on the presence/absence of an abnormality made by the first and second abnormality detection units 202 and 203 can be considered to be provisional (or temporary) determinations that are made prior to the final determination.

The comprehensive determination unit 204 may make a determination based on detection results of the first and second abnormality detection units 202 and 203 in accordance with a predetermined final determination rule. Any arbitrary rule can be used as the final determination rule. However, as an example, the comprehensive determination unit 204 makes a final determination in accordance with the following rule.

In this embodiment, the comprehensive determination unit 204 makes a final determination while giving a higher priority to the detection result of the second abnormality detection unit 203 than to the detection result of the first abnormality detection unit 202. That is, when the detection result of the first abnormality detection unit 202 for an image of a given camera does not match the detection result of the second abnormality detection unit 203, the comprehensive determination unit 204 makes a final determination on whether or not the image of this camera is abnormal by adopting the detection result of the second abnormality detection unit 203. This is because while the detection by the first abnormality detection unit 202 is an abnormality determination by using images taken by only one camera, the detection by the second abnormality detection unit 203 is performed by comparing images taken by at least two cameras. Therefore, in view of the fact that a possibility that similar abnormalities occur in both of the images to be compared is small, the determination accuracy for the detection performed by the second abnormality detection unit 203 is higher than that of the first abnormality detection unit 202.

Further, in this embodiment, the comprehensive determination unit 204 handles the detection performed by the second abnormality detection unit 203 as follows. Note that the following descriptions are given by using images taken by the cameras 101A and 101B as images to be compared in the second abnormality detection unit 203. However, the comprehensive determination unit 204 performs a similar process for each of the other combinations of cameras whose shooting ranges overlap each other.

The comprehensive determination unit 204 determines whether or not the detection result of the second abnormality detection unit 203 for the images of the cameras 101A and 101B should be used for the final determination based on the number of samples in a frequency distribution (a histogram) (i.e., the total number of optical flows for each direction) for the image of the camera 101A and the number of samples in a frequency distribution (a histogram) (i.e., the total number of optical flows for each direction) for the image of the camera 101B.

It is considered that when the number of samples in the frequency distribution is less than a predetermined number, the reliability of the result of the comparison using this frequency distribution is low. Therefore, for example, when the number of samples in the frequency distribution of the image of the camera 101A and the number of samples in the frequency distribution of the image of the camera 101B are both less than a predetermined number, the comprehensive determination unit 204 does not use the detection result of the second abnormality detection unit 203 obtained based on these frequency distributions for the final determination. Note that when the numbers of samples in the frequency distributions are both less than the predetermined number, the comparison process performed by the second abnormality detection unit 203 may be skipped.

On the other hand, for example, when the number of samples in the frequency distribution of the image of the camera 101A and the number of samples in the frequency distribution of the image of the camera 101B are both equal to or greater than the predetermined number, the comprehensive determination unit 204 uses the detection result of the second abnormality detection unit 203 obtained based on these frequency distributions for the final determination. That is, in this case, the comprehensive determination unit 204 makes the final determination while taking account of the detection result of the second abnormality detection unit 203 based on these frequency distributions.

Note that when the number of samples in the frequency distribution of one of the images to be compared is less than the predetermined number and the number of samples in the frequency distribution of the other of the images to be compared is equal to or greater than the predetermined number, the comprehensive determination unit 204 handles the detection result of the second abnormality detection unit 203 obtained based on these frequency distributions as follows. In this case, when the second abnormality detection unit 203 determines that the images of the cameras 101A and 101B are normal, the comprehensive determination unit 204 uses the detection result of the second abnormality detection unit 203 obtained based on these frequency distributions for the final determination. On the other hand, when the second abnormality detection unit 203 determines that the image of the camera 101A or 101B is abnormal, the comprehensive determination unit 204 does no use the detection result of the second abnormality detection unit 203 obtained based on these frequency distributions for the final determination.

Note that even when the detection result obtained by the comparison between the frequency distributions of the images of the cameras 101A and 101B is not used in the comprehensive determination unit 204, a detection result obtained by a comparison between a frequency distribution of an image of the camera 101A and a frequency distribution of an image of the camera 101D, which is located adjacent to the camera 101A, could be used in the comprehensive determination unit 204. This is because there are cases in which while the total number of optical flows for a feature point in one of the comparison areas of the camera 101A is small, the total number of optical flows for a feature point in the other comparison area is larger. Similarly, a detection result obtained by a comparison between a frequency distribution of an image of the camera 101B and a frequency distribution of an image of the camera 101C, which is located adjacent to the camera 101B, could be used in the comprehensive determination unit 204.

Figure 7:
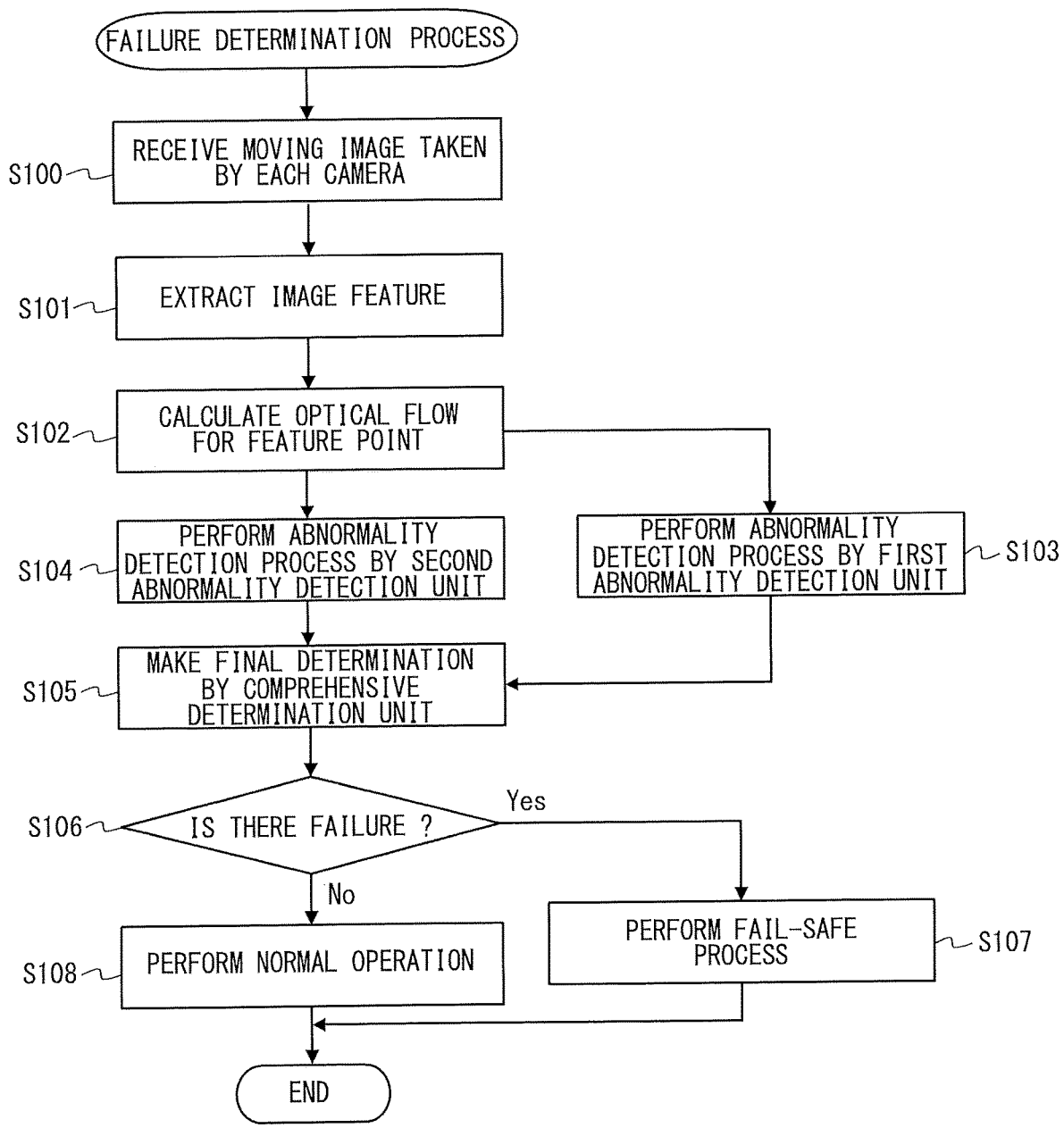
FIG. 7 is a flowchart showing an example of an operation for an abnormality determination process performed by the vehicle system according to the first embodiment.

Next, an operation for the abnormality determination process performed by the vehicle system 10 according to this embodiment is described. FIG. 7 is a flowchart showing an example of an operation for the abnormality determination process performed by the vehicle system 10 according to the first embodiment. The operation for the abnormality determination process performed by the vehicle system 10 is described hereinafter with reference to the flowchart shown in FIG. 7.

In a step 100 (S100), images of moving images taken by the cameras 101A to 101D are input to the image recognition processor 160. Note that when the extension camera 106 is provided, images of moving images taken by the extension camera 106 are also input to the image recognition processor 160.

Next, in a step 101 (S101), the feature extraction unit 200 extracts image features of the image taken by each camera.

Next, in a step 102 (S101), the flow calculation unit 201 calculates optical flows for the feature points extracted by the feature extraction unit 200.

Next, processes in steps 103 and 104 (S103 and S104) are performed. Note that the processes in the steps 103 and 104 (S103 and S104) may be performed in parallel with each other as shown in FIG. 7, or may be performed one after another.

In the step 103, the first abnormality detection unit 202 performs an abnormality detection process by using the optical flow obtained in the step 102. Further, in the step 104, the second abnormality detection unit 203 performs an abnormality detection process by using the optical flow obtained in the step 102. That is, the result of the processes in the steps 101 and 102 is shared (i.e., used) by both of the first and second abnormality detection unit 202 and 203.

Next, in a step 105 (S105), the comprehensive determination unit 204 makes a final determination on the presence/absence of an abnormality in an image based on the detection results of the first and second abnormality detection units 202 and 203. When the image is determined to be abnormal by the comprehensive determination unit 204 (Yes in step 106 (S106)), i.e., when it is determined that a failure has occurred, a predetermined fail-safe process is carried out (step 107 (S107)). For example, when the comprehensive determination unit 204 finally determines that the image is abnormal, it notifies the determination MCU 111 of the occurrence of the abnormality. Upon receiving the notification about the occurrence of the abnormality, the determination MCU 111 performs a fail-safe process such as displaying a warning in the warning display device 104 and initializing the recognition MCU 110. When the image is determined to be normal by the comprehensive determination unit 204 (No in step 106 (S106)), the normal operation is carried out (i.e., continued) (step 108 (S108)).

The first embodiment has been described above. In the vehicle system 10, the first abnormality detection unit 202 performs abnormality detection using images acquired from one camera and the second abnormality detection unit 203 performs abnormality detection by comparing at least two images acquired from respective cameras. Therefore, accuracy of the abnormality detection can be improved compared to the case where only one type of abnormality detection is performed. Further, both of the image features for the first abnormality detection unit 202 and those for the second abnormality detection unit 203 are extracted by using the common extraction algorithm. Therefore, it is possible to efficiently carry out the process for extracting image features. Further, in the vehicle system 10, a partial area in the image, rather than the entire area of the image, is used as an extraction range for the image feature for a starting point of an optical flow. Therefore, it is possible to reduce the load for the process for extracting image features. Therefore, the vehicle system 10 makes it possible to carry out both of abnormality detection by the first abnormality detection unit 202 and abnormality detection by the second abnormality detection unit 203 while reducing the processing load.

Further, the first abnormality detection unit 202 detects an abnormality in an image based on temporal changes of an optical flow obtained from images acquired from one camera. Therefore, it is possible to carry out abnormality detection by using images acquired from one camera.

Further, the second abnormality detection unit 203 detects an abnormality in an image by using an optical flow for a feature point in an overlapped area of a plurality of images acquired from respective cameras. Therefore, since both of the first and second abnormality detection unit 202 and 203 detect an abnormality in an image by using an optical flow, the result of the process for calculating the optical flow can be shared (i.e., used) by both of the first and second abnormality detection units 202 and 203. That is, it is possible to reduce the load for the process related to the abnormality detection.

Further, the first abnormality detection unit 202 detects an abnormality in an image by using an optical flow that is obtained by using a range wider than the tracking range used in the second abnormality detection unit 203 as its tracking range. The detection by the second abnormality detection unit 203 is performed by comparing overlapped areas of a plurality of images. Therefore, the area that can be used for the detection is limited. In contrast to this, in the detection by the first abnormality detection unit 202, it is possible to perform the abnormality detection by using a wider area in addition to the overlapped area. It is desirable that the tracking area be large in order to reliably detect an optical flow. In this embodiment, as described above, the first abnormality detection unit 202 uses a range wider than the tracking range used in the second abnormality detection unit 203 as its tracking range. Therefore, it is possible to detect an optical flow for the first abnormality detection unit 202 more reliably compared to the case where the first abnormality detection unit 202 uses the same range as the tracking range used in the second abnormality detection unit 203 as its tracking range. In other words, it is possible to improve accuracy of the abnormality detection performed by the first abnormality detection unit 202 compared to the case where the tracking ranges of the first and second abnormality detection units 202 and 203 are same as each other.

Further, the second abnormality detection unit 203 detects an abnormality by comparing a frequency distribution for an optical flow in one of the images with a frequency distribution of an optical flow in the other image. Therefore, it is possible to compare images by using optical flows.

Further, the comprehensive determination unit 204 determines whether or not the result of the abnormality detection by the second abnormality detection unit 203 should be used for the final determination based on the number of samples in the frequency distributions. Therefore, it is possible to prevent, when the number of samples in the frequency distribution is small and hence the reliability of the frequency distribution is low, the result of the abnormality detection by the second abnormality detection unit 203 from being reflected in (i.e., used for) the final determination.

Further, the comprehensive determination unit 204 makes a final determination while giving a higher priority to the detection result of the second abnormality detection unit 203 than to the detection result of the first abnormality detection unit 202. Therefore, a detection result by the second abnormality detection unit 203, in which images of at least two cameras are compared and hence whose reliability is higher than that in the determination technique using one camera, is preferentially used. Therefore, it is possible to make a more reliable final determination.

Second Embodiment

Next, a second embodiment is described. In the first embodiment, the comparison area has a rectangular shape. That is, the second abnormality detection unit 203 creates a frequency distribution by using an optical flow for a feature point in a pre-designated rectangular area in an overlapped extraction area (e.g., the rectangular area $R4_A$ or $R4_B$). In contrast to this, a comparison area has a circular shape in the second embodiment. That is, in the second embodiment, a frequency distribution is creased by using an optical flow for a feature point in a pre-designated circular area (e.g., a rectangular area $R5_A$ or $R5_B$ in FIG. 8) in an overlapped extraction area. The second embodiment is described hereinafter. However, descriptions of configurations and operations similar to those in the first embodiment are omitted.

As described above, when the shooting directions of a plurality of cameras to be compared differ from each other, it is necessary to create a histogram of optical flows in which moving directions are normalized. That is, it is necessary to perform a process for rotating by a predetermined angle for each camera and then create a histogram. Therefore, in this embodiment, a comparison area for images taken by cameras is specified by its center coordinates (x, y), a radius r, and a rotational angle θ. Note that the rotation angle θ is an angle for normalizing the moving direction and is an angle that is determined in advance for each camera based on its shooting direction.

Figure 8:
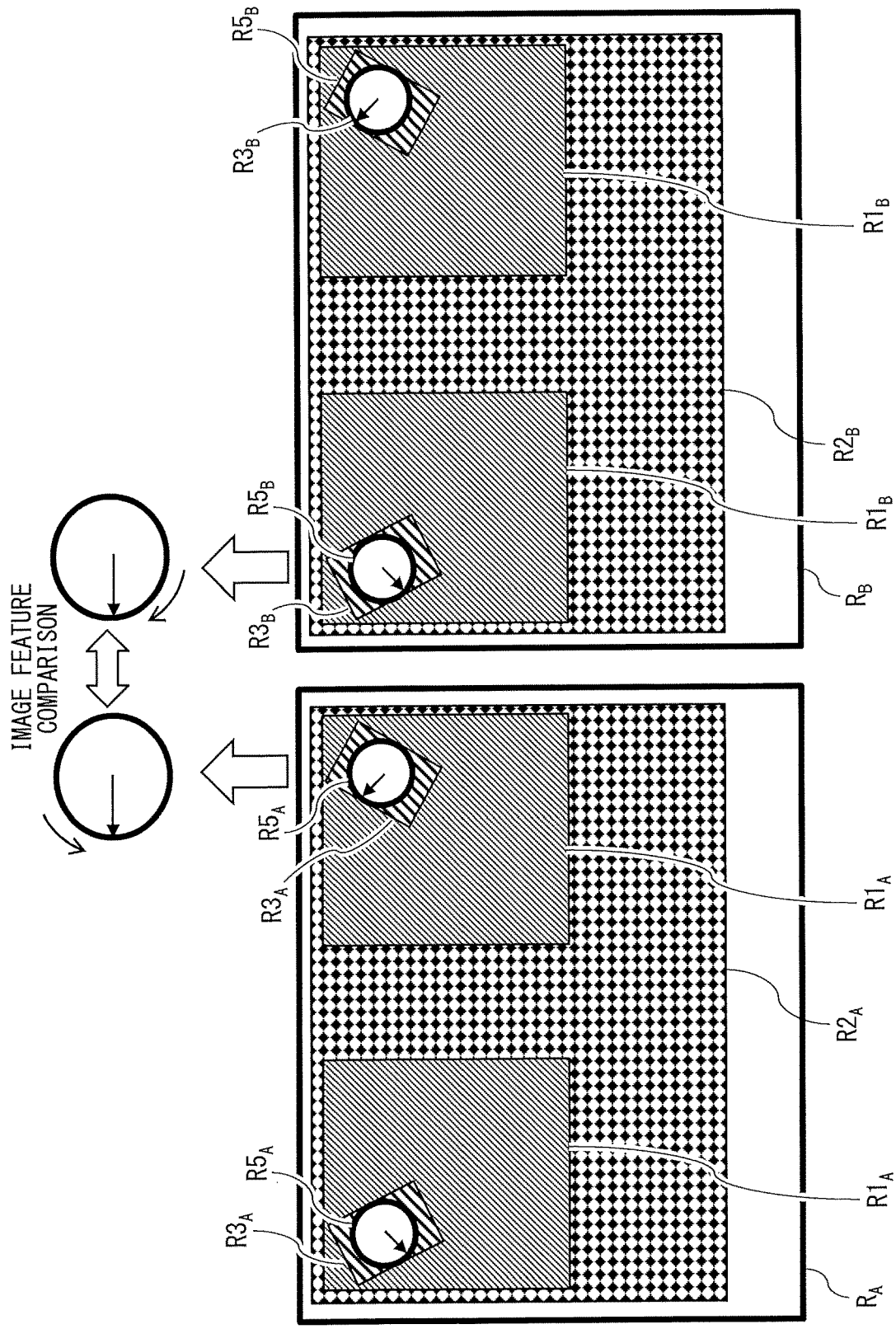
FIG. 8 is a schematic diagram showing comparison areas according to a second embodiment.

FIG. 8 is a schematic diagram showing a comparison area according to the second embodiment. As shown in FIG. 8, the second abnormality detection unit 203 according to the second embodiment uses, among optical flows for feature points calculated for images taken by the camera 101A by the flow calculation unit 201, optical flows for feature points in a circular area $R5_A$, which is obtained by rotating a range determined by center coordinates $(x_A, y_A)$ and a radius $r_A$ by an angle $\theta_A$, as optical flows to be compared, and by doing so, creates a frequency distribution in which the moving directions of the optical flows are rotated by the angle $\theta_A$. Similarly, the second abnormality detection unit 203 according to the second embodiment uses, among optical flows for feature points calculated for images taken by the camera 101B by the flow calculation unit 201, optical flows for feature points in a circular area $R5_B$, which is obtained by rotating a range determined by center coordinates $(x_B, y_B)$ and a radius $r_B$ by an angle $\theta_B$, as optical flows to be compared, and by doing so, creates a frequency distribution in which the moving directions of the optical flows are rotated by the angle $\theta_B$. Then, the second abnormality detection unit 203 detects an abnormality in an image by comparing these frequency distributions. Note that in this embodiment, since the comparison area has a circular shape, the range of the comparison area does not change even when the comparison area is rotated by the angle $\theta_A$ or $\theta_B$.

In the first embodiment, the comparison area has a rectangular shape. In this case, assume that, for example, a comparison area for an image taken by a camera is specified by coordinates (x, y) of its upper-left corner, a width w of the rectangular, a height h of the rectangular, and a rotation angle θ. Alternatively, assume that the comparison area is specified by coordinates (x0, y0) of its upper-left corner, coordinates (x1, y1) of the lower-right corner, and a rotation angle θ. In this case, the area that is obtained by rotating the rectangular area specified by the coordinates by the rotation angle θ becomes a range that differs from the rectangular range specified by the coordinates. Therefore, the range that is defined based on the coordinates does not coincide with the range that is actually compared. As a result, there is a possibility that the comparison area of the camera 101A does not corresponds to the comparison area of the camera 101B. In contrast to this, in this embodiment, the comparison area has a circular shape and its range does not change even when it is rotated. Therefore, it is possible to make the comparison area of the camera 101A correspond to the comparison area of the camera 101B and thereby to detect an abnormality more accurately.

Third Embodiment

Next, a third embodiment is described. In the first and second embodiments, an abnormality is determined based solely on information obtained from images. In contrast to this, in this embodiment, information about a movement of the vehicle is taken into account for the determination of an abnormality in an image acquired from a camera. The third embodiment is described hereinafter. However, descriptions of configurations and operations similar to those in the first and second embodiments are omitted.

Figure 9:
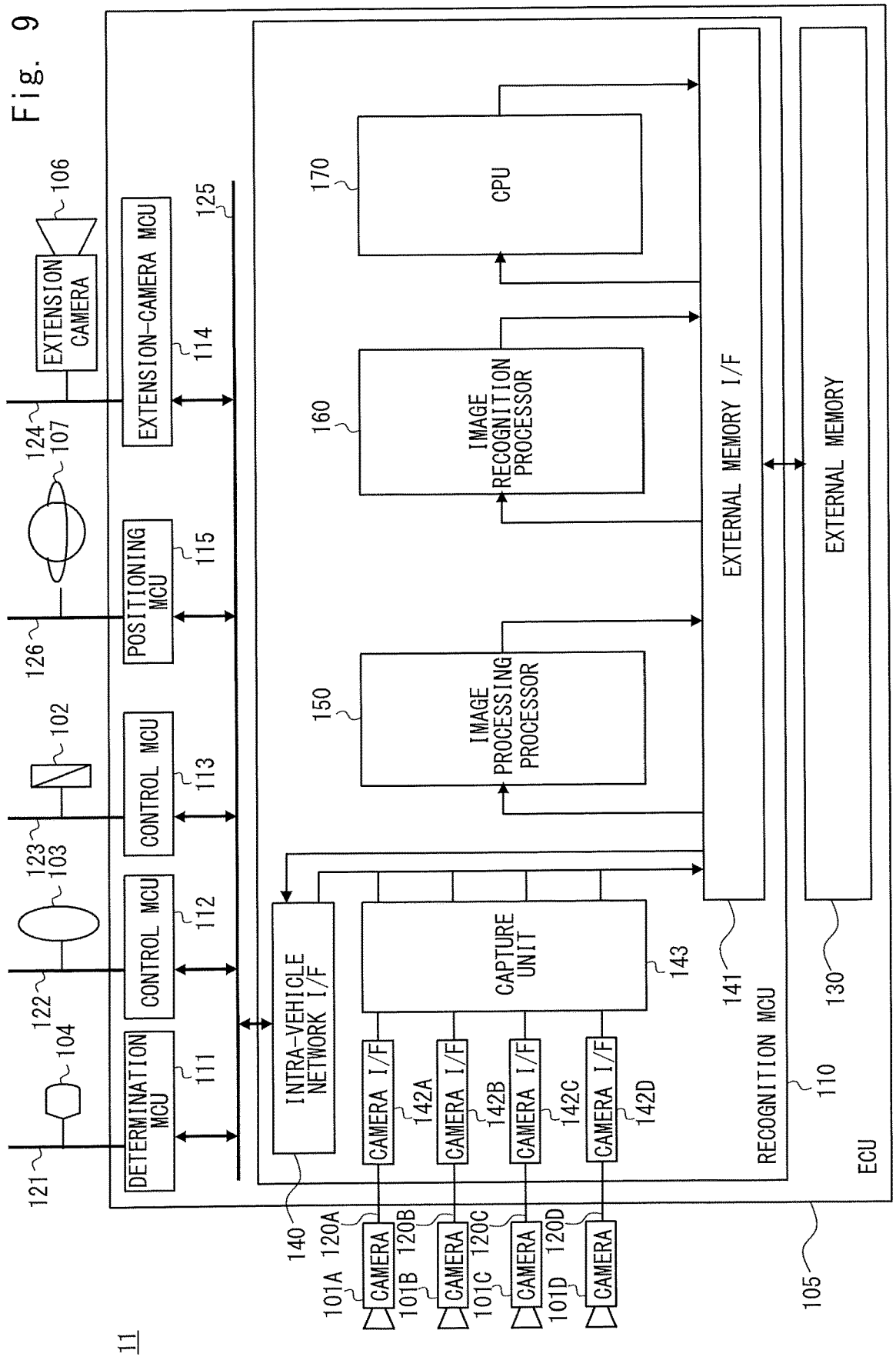
FIG. 9 is a block diagram showing an example of a hardware configuration of a vehicle system according to a third embodiment.

FIG. 9 is a block diagram showing an example of a hardware configuration of a vehicle system 11 according to the third embodiment. The vehicle system 11 differs from the vehicle system 10 shown in FIG. 3 in that the vehicle system 11 further includes a GNSS device 107 and a positioning MCU 115.

The GNSS device 107 is a terminal that acquires positioning information of the vehicle 100 based on a GNSS (Global Navigation Satellite System) signal. The positioning MCU 115 is provided in the ECU 105. The positioning MCU 115 is connected to the GNSS device 107 through a bus 126 and calculates direction information indicating a moving direction of the vehicle 100 and speed information indicating a moving speed of the vehicle 100 based on the positioning information acquired by the GNSS device 107. Further, the positioning MCU 115 is connected to the intra-vehicle network 125 and outputs a calculation result to the recognition MCU 110.

Figure 10:
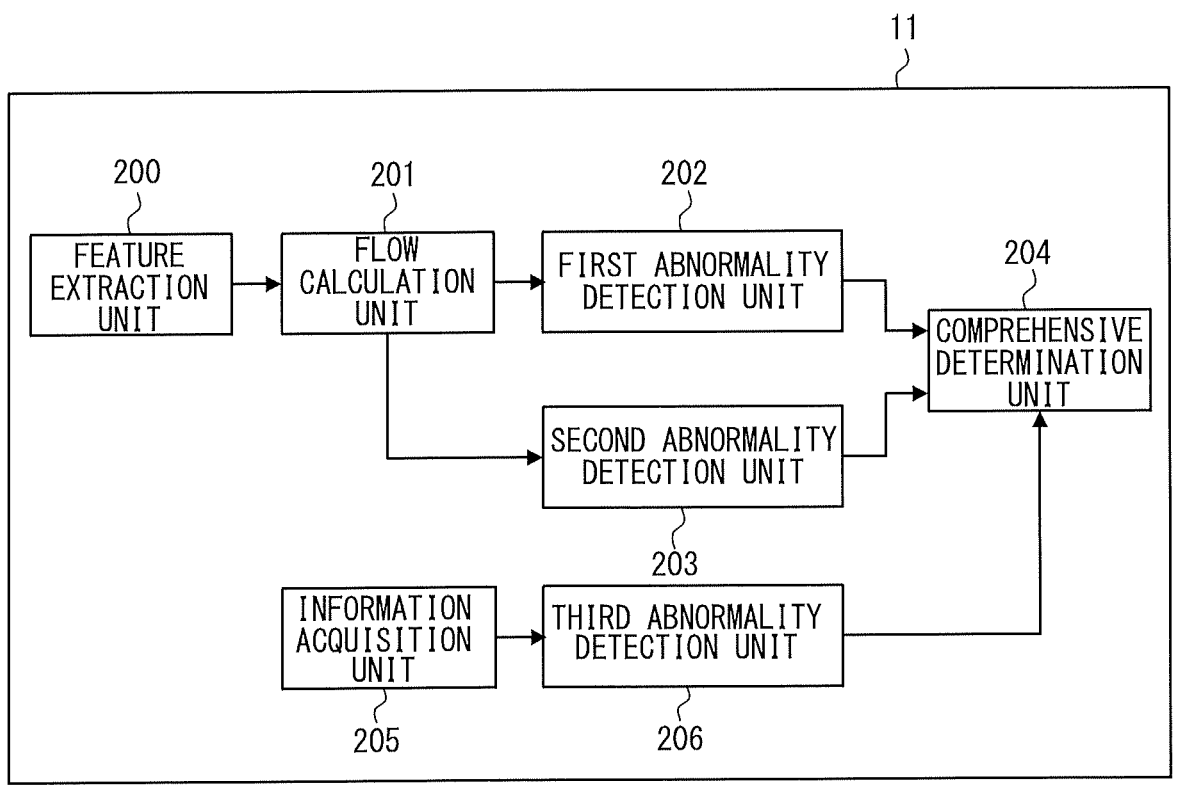
FIG. 10 is a block diagram showing an example of a functional configuration in the vehicle system according to the third embodiment.

FIG. 10 is a block diagram showing an example of a functional configuration related to an abnormality detection process performed in the vehicle system 11. As shown in FIG. 10, the vehicle system 11 includes a feature extraction unit 200, a flow calculation unit 201, an information acquisition unit 205, a first abnormality detection unit 202, a second abnormality detection unit 203, a third abnormality detection unit 206, and an comprehensive determination unit 204 as the configuration of the abnormality detection apparatus. That is, the configuration of the vehicle system 11 differs from that shown in FIG. 4 in that the information acquisition unit 205 and the third abnormality detection unit 206 are added in the vehicle system 11. Similar to the first and second abnormality detection units 202 and 203, and the comprehensive determination unit 204, the information acquisition unit 205 and the third abnormality detection unit 206 are implemented by the CPU 170.

The information acquisition unit 205 acquires direction information indicating a moving direction of the vehicle 100 and speed information indicating a moving speed of the vehicle 100. Specifically, the information acquisition unit 205 acquires direction information and speed information calculated by the positioning MCU 115. However, the information source is not limited to the above-described example. That is, the information acquisition unit 205 may acquire the direction information and the speed information of the vehicle from any other devices. For example, the information acquisition unit 205 may acquire direction information of the vehicle 100 that is calculated by the control MCU 112 based on a steering angle measured by the steering wheel 103, and may acquire speed information output from a vehicle-speed sensor (not shown).

When the moving speed and the moving direction of the vehicle, and the shooting direction of a camera are obtained, a movement vector of a feature point included in an image taken by this camera can be calculated. Therefore, the third abnormality detection unit 206 estimates an optical flow for the image of this camera based on information acquired by the information acquisition unit 205 and a predetermined shooting direction of the camera. Then, the third abnormality detection unit 206 detects an abnormality in an image of this camera by comparing the estimated optical flow with an actual optical flow for the image of the camera calculated by the flow calculation unit 201. The third abnormality detection unit 206 performs a process for detecting an abnormality in an image for each camera.

The third abnormality detection unit 206 detects an abnormality in an image by comparing a frequency distribution (a histogram) indicating the number of samples (a frequency) for each direction for an optical flow for a feature point extracted from a feature extraction range and a frequency distribution (a histogram) indicating the number of samples (a frequency) for each direction for an optical flow estimated from information acquired from the information acquisition unit 205. Specifically, the third abnormality detection unit 206 calculates a normalized cross-correlation between elements of both frequency distributions and determines whether or not both frequency distributions are similar to each other. When both frequency distributions are similar to each other, the third abnormality detection unit 206 determines that the image to be compared is normal. When both frequency distributions are not similar to each other, the third abnormality detection unit 206 determines that the image to be compared is abnormal. For example, when a feature point included in an image taken by a given camera is not moving over time even though the vehicle 100 is moving, the third abnormality detection unit 206 can detect that an abnormality has occurred in the image taken by this camera.

Note that in the abnormality detection by the second abnormality detection unit 203, it is impossible to specify which of the images to be compared the detected abnormality has occurred in. In contrast to this, in the abnormality detection by the third abnormality detection unit 206, it is possible to specify which of the images of the cameras the abnormality has occurred in as in the case of the first abnormality detection unit 202.

The comprehensive determination unit 204 according to this embodiment makes a final determination on the presence/absence of an abnormality in an image based on detection results of the first, second and third abnormality detection units 202, 203 and 206. Therefore, the determinations on the presence/absence of an abnormality made by the first, second and third abnormality detection units 202, 203 and 206 can be considered to be provisional (i.e., temporary) determinations that are made prior to the final determination.

The comprehensive determination unit 204 may make a determination based on detection results of the first, second and third abnormality detection units 202, 203 and 206 in accordance with a predetermined final determination rule. Any arbitrary rule can be used as the final determination rule.

As described above, regarding the determination result by the second abnormality detection unit 203, when the number of samples in the frequency distribution is less than a predetermined number, a reliable detection result cannot be obtained from the second abnormality detection unit 203. Further, in the determination by the first abnormality detection unit 202, a correct determination cannot be obtained unless the feature point in the image is moving. Therefore, for example, the comprehensive determination unit 204 may use a determination made by the third abnormality detection unit 206 as a final determination when a reliable determination result cannot be obtained from the second abnormality detection unit 203 and a determination result also cannot be obtained from the first abnormality detection unit 202.

Next, an operation for the abnormality determination process performed by the vehicle system 11 according to this embodiment is described. FIG. 11 is a flowchart showing an example of an operation for the abnormality determination process performed by the vehicle system 11 according to the third embodiment. The flowchart shown in FIG. 11 is obtained by adding a step 150 (S150) and a step 151 (S151) in the flowchart shown in FIG. 7. Further, in the flowchart shown in FIG. 11, the step 105 (S105) shown in the flowchart of FIG. 7 is replaced by a step 152 (S152). The other steps shown in FIG. 11 are similar to those in FIG. 7. Differences from the flowchart shown in FIG. 7 are described hereinafter, in which duplicated explanations are omitted.

In the operation for the abnormality determination process performed by the vehicle system 11, the information acquisition unit 205 acquires speed information indicating a moving speed of the vehicle 100 and direction information indicating a moving direction of the vehicle 100 in a step 150 (S150). Note that in the example shown in FIG. 11, the step 150 is performed after the step 102. However, the step 150 may be performed at any timing before the process performed by the third abnormality detection unit 206 in the step 151.

After the step 150, the third abnormality detection unit 206 detects an abnormality by estimating an optical flow from the information obtained in the step 150 and comparing the estimated optical flow with the optical flow calculated in the step 102 in a step 151 (S151). Note that the third abnormality detection unit 206 performs the abnormality detection process for each camera.

Note that the processes in the steps 103, 104 and 150 may be performed in parallel with each other as shown in FIG. 11, or may be performed one after another.

Next, in a step 152 (S152), the comprehensive determination unit 204 makes a final determination on the presence/absence of an abnormality in an image based on the detection results of the first, second and third abnormality detection units 202, 203 and 206.

The third embodiment has been described above. The vehicle system 11 according to this embodiment includes the third abnormality detection unit 206 in addition to the first and second abnormality detection unit 202 and 203. Therefore, it is possible to detect an abnormality in an image more reliably.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure. For example, each component shown in FIGS. 1, 4 and 10 may be partially or entirely implemented by a hardware circuit, or may be implemented by software. When the component is implemented by software, it can be implemented by, for example, having a processor such as a CPU execute a program loaded in a memory.

Further, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first to third embodiments can be combined as desirable by one of ordinary skill in the art.

While the disclosure has been described in terms of several embodiments, those skilled in the art will recognize that the disclosure can be practiced with various modifications within the spirit and scope of the appended claims and the disclosure is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An abnormality detection apparatus comprising:
a feature extraction circuit configured to extract a feature point and a feature value of a first image taken by a first camera, and a feature point and a feature value of a second image taken by a second camera;
a flow calculation circuit configured to calculate, based on the feature value of the first image, a first optical flow for a feature point of a first partial area included in the first image and a second optical flow for a feature point of a first overlapped area included in the first image, and to calculate, based on the feature value of the second image, a third optical flow for a feature point of a second partial area included in the second image and a fourth optical flow for a feature point of a second overlapped area included in the second image;
a first abnormality detection circuit configured to detect an abnormality in the first image based on the first optical flow, and to detect an abnormality in the second image based on the third optical flow; and
a second abnormality detection circuit configured to detect an abnormality in the first or second image based on a result of a comparison between the second optical flow and the fourth optical flow,
wherein a shooting range of the second camera partially overlaps a shooting range of the first camera,
wherein the first overlapped area comprises an area in the first image that overlaps the second image, and
wherein the second overlapped area comprises an area in the second image that overlaps the first image.

2. The abnormality detection apparatus according to claim 1,
wherein an extraction range for the feature point and the feature value of the first and second images extracted by the feature extraction circuit is composed of the first partial area, the second partial area, and areas near places in the first and second images predicted as destinations of the feature point of the first and second images,
wherein the first overlapped area includes an area in the first partial area that corresponds to the second partial area, and
wherein the second overlapped area includes an area in the second partial area that corresponds to the first partial area.

3. The abnormality detection apparatus according to claim 1,
wherein the second optical flow comprises an optical flow for a feature point in a predetermined circular area designated in the first overlapped area, and
wherein the fourth optical flow comprises an optical flow for a feature point in a predetermined circular area designated in the second overlapped area.

4. The abnormality detection apparatus according to claim 1,
wherein the second optical flow is obtained by using a predetermined area in the first overlapped area as a tracking range for that optical flow,
wherein the fourth optical flow is obtained by using a predetermined area in the second overlapped area as a tracking range for that optical flow, and
wherein the first optical flow and the third optical flow are obtained by using a range wider than the tracking range used in the second optical flow and the fourth optical flow as a tracking range.

5. The abnormality detection apparatus according to claim 1,
wherein the second abnormality detection circuit is configured to compare a first frequency distribution and a second frequency distribution,
wherein the first frequency distribution comprises a frequency distribution for numbers of samples for each direction for the second optical flow, and
wherein the second frequency distribution comprises a frequency distribution for numbers of samples for each direction for the fourth optical flow.

6. The abnormality detection apparatus according to claim 5, further comprising a comprehensive determination circuit configured to make a final determination on presence/absence of an abnormality in the first or second image based on detection results of the first and second abnormality detection circuits, and
wherein the comprehensive determination circuit is configured to determine whether or not a detection result of the second abnormality detection circuit should be used for the final determination based on the number of samples in the first frequency distribution and the number of samples in the second frequency distribution.

7. The abnormality detection apparatus according to claim 1, further comprising a comprehensive determination circuit configured to make a final determination on presence/absence of an abnormality in the first or second image based on detection results of the first and second abnormality detection circuits, and
wherein the comprehensive determination circuit is configured to make the final determination while giving a higher priority to the detection result of the second abnormality detection circuit than to the detection result of the first abnormality detection circuit.

8. The abnormality detection apparatus according to claim 1, wherein the first abnormality detection circuit is configured to:
detect an abnormality in the first image based on whether or not temporal changes of a moving direction and a moving amount of the first optical flow are within predetermined ranges; and
detect an abnormality in the second image based on whether or not temporal changes of a moving direction and a moving amount of the third optical flow are within predetermined ranges.

9. A vehicle system including the abnormality detection apparatus according to claim 1, comprising the first and second cameras disposed in a vehicle, and configured to shoot a surrounding of the vehicle.

10. An abnormality detection apparatus comprising:
a memory storing a program; and
a processor executing the program and configured to:
extract a feature point and a feature value in a first image taken by a first camera;
extract a feature point and a feature value in a second image taken by a second camera;
calculate, based on the feature value of the first image, a first optical flow for a feature point of a first partial area included in the first image and a second optical flow for a feature point of a first overlapped area included in the first image;
calculate, based on the feature value of the second image, a third optical flow for a feature point of a second partial area included in the second image and a fourth optical flow for a feature point of a second overlapped area included in the second image;
detect an abnormality in the first image based on the first optical flow;
detect an abnormality in the second image based on the third optical flow; and
detect an abnormality in the first or second image based on a result of a comparison between the second optical flow and the fourth optical flow,
wherein a shooting range of the second camera partially overlaps a shooting range of the first camera,
wherein the first overlapped area comprises an area in the first image that overlaps the second image, and
wherein the second overlapped area comprises an area in the second image that overlaps the first image.

11. The abnormality detection apparatus according to claim 10,
wherein an extraction range for the feature point and the feature value of the first and second images extracted is composed of the first partial area, the second partial area, and areas near places in the first and second images predicted as destinations of the feature point of the first and second images,
wherein the first overlapped area includes an area in the first partial area that corresponds to the second partial area, and
wherein the second overlapped area includes an area in the second partial area that corresponds to the first partial area.

12. The abnormality detection apparatus according to claim 10,
wherein the second optical flow comprises an optical flow for a feature point in a predetermined circular area designated in the first overlapped area, and
wherein the fourth optical flow comprises an optical flow for a feature point in a predetermined circular area designated in the second overlapped area.

13. The abnormality detection apparatus according to claim 10,
wherein the second optical flow is obtained by using a predetermined area in the first overlapped area as a tracking range for that optical flow,
wherein the fourth optical flow is obtained by using a predetermined area in the second overlapped area as a tracking range for that optical flow, and
wherein the first optical flow and the third optical flow are obtained by using a range wider than the tracking range used in the second optical flow and the fourth optical flow as a tracking range.

14. The abnormality detection apparatus according to claim 10,
wherein the processor is further configured to compare a first frequency distribution and a second frequency distribution,
wherein the first frequency distribution comprises a frequency distribution for numbers of samples for each direction for the second optical flow, and
wherein the second frequency distribution comprises a frequency distribution for numbers of samples for each direction for the fourth optical flow.

15. The abnormality detection apparatus according to claim 14,
wherein results of detecting the abnormality in the first image based on the first optical flow and results of detecting the abnormality in the second image based on the third optical flow comprises a first abnormality detection result,
wherein a result of detecting the abnormality in the first or second image based on a result of the comparison between the second optical flow and the fourth optical flow comprises a second abnormality detection result,
wherein the processor is further configured to:
make a final determination on presence/absence of an abnormality in the first or second image based on the first abnormality detection result and the second abnormality detection result; and
determine whether or not the second abnormality detection result should be used for the final determination based on the number of samples in the first frequency distribution and the number of samples in the second frequency distribution.

16. The abnormality detection apparatus according to claim 10,
wherein results of detecting the abnormality in the first image based on the first optical flow and results of detecting the abnormality in the second image based on the third optical flow comprises a first abnormality detection result,
wherein a result of detecting the abnormality in the first or second image based on a result of the comparison between the second optical flow and the fourth optical flow comprises a second abnormality detection result,
wherein the processor is further configured to:
make a final determination on presence/absence of an abnormality in the first or second image based on the first abnormality detection result and the second abnormality detection result; and determine make the final determination while giving a higher priority to the second abnormality detection result than to the first abnormality detection result.

17. The abnormality detection apparatus according to claim 10, wherein the processor is further configured to:

detect an abnormality in the first image based on whether or not temporal changes of a moving direction and a moving amount of the first optical flow are within predetermined ranges; and detect an abnormality in the second image based on whether or not temporal changes of a moving direction and a moving amount of the third optical flow are within predetermined ranges.

18. A vehicle system including the abnormality detection apparatus according to claim 10, comprising the first and second cameras disposed in a vehicle, and configured to shoot a surrounding of the vehicle.

19. A computer program product comprising a non-transitory computer readable storage medium having program instructions embodied therewith, the program instructions readable and executable by a computer to cause the computer to perform a method for an abnormality detection, the method comprising:

extracting a feature point and a feature value of a first image taken by a first camera, and a feature point and a feature value of a second image taken by a second camera;

calculating, based on the feature value of the first image, a first optical flow for a feature point of a first partial area included in the first image and a second optical flow for a feature point of a first overlapped area included in the first image;

calculating, based on the feature value of the second image, a third optical flow for a feature point of a second partial area included in the second image and a fourth optical flow for a feature point of a second overlapped area included in the second image;

detecting an abnormality in the first image based on the first optical flow;

detecting an abnormality in the second image based on the third optical flow; and detecting an abnormality in the first or second image based on a result of a comparison between the second optical flow and the fourth optical flow, wherein a shooting range of the second camera partially overlaps a shooting range of the first camera, wherein the first overlapped area comprises an area in the first image that overlaps the second image, and wherein the second overlapped area comprises an area in the second image that overlaps the first image.

* * * * *